(12) United States Patent
Han et al.

(10) Patent No.: US 10,860,191 B2
(45) Date of Patent: Dec. 8, 2020

(54) METHOD FOR ADJUSTING SCREEN SIZE AND ELECTRONIC DEVICE THEREFOR

(71) Applicant: Samsung Electronics Co., Ltd., Suwon-si (KR)

(72) Inventors: Jonghyun Han, Seoul (KR); Kwanghyun Ko, Suwon-si (KR); Dongkyu Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/465,943

(22) PCT Filed: Nov. 3, 2017

(86) PCT No.: PCT/KR2017/012366
§ 371 (c)(1),
(2) Date: May 31, 2019

(87) PCT Pub. No.: WO2018/101621
PCT Pub. Date: Jun. 7, 2018

(65) Prior Publication Data
US 2020/0034026 A1    Jan. 30, 2020

(30) Foreign Application Priority Data

Dec. 2, 2016  (KR) .......................... 10-2016-0163681

(51) Int. Cl.
*G06F 3/0484* (2013.01)
*G06F 3/0481* (2013.01)
*G06F 3/0488* (2013.01)

(52) U.S. Cl.
CPC ........ *G06F 3/04845* (2013.01); *G06F 3/0481* (2013.01); *G06F 3/0488* (2013.01)

(58) Field of Classification Search
CPC .................................................. G06F 3/04845
(Continued)

(56) References Cited

U.S. PATENT DOCUMENTS

| 5,675,755 A | * | 10/1997 | Trueblood | ............ G06F 3/0481 715/791 |
| 5,784,067 A | * | 7/1998 | Ryll | ...................... G06T 11/206 345/440 |

(Continued)

FOREIGN PATENT DOCUMENTS

| EP | 2835728 A1 | 2/2015 |
| EP | 3086218 A1 | 10/2016 |

(Continued)

OTHER PUBLICATIONS

Supplementary European Search Report dated Nov. 8, 2019 in connection with European Patent Application No. 17 87 5293, 8 pages.

(Continued)

*Primary Examiner* — Reza Nabi

(57) ABSTRACT

Various embodiments of the present invention relate to an apparatus and method for adjusting a screen size in an electronic device. The electronic device comprises a touch screen and a processor, wherein the processor may perform control so as to: detect a touch input from a reference area set in at least a partial area of the touch screen; when it is detected that the touch input moves, activate a screen adjustment mode on the basis of a movement range of the touch input; when the touch input is maintained, adjust a screen size of the touch screen on the basis of the movement distance of the touch input; and when the touch input is released, set, as a screen size in the screen adjustment mode, the screen size at the time when the touch input is released. Other embodiments may also be possible.

18 Claims, 22 Drawing Sheets

(58) Field of Classification Search
USPC .......................................................... 715/800
See application file for complete search history.

(56) References Cited

U.S. PATENT DOCUMENTS

| | | | |
|---|---|---|---|
| 7,949,954 B1* | 5/2011 | Jezek, Jr. ................. | G06F 3/048 715/800 |
| 2007/0006093 A1* | 1/2007 | Day ........................ | G06F 9/451 715/781 |
| 2009/0024956 A1* | 1/2009 | Kobayashi ............ | G06F 3/0481 715/784 |
| 2009/0031247 A1 | 1/2009 | Walter et al. | |
| 2013/0285933 A1 | 10/2013 | Sim et al. | |
| 2014/0145975 A1* | 5/2014 | Sim ..................... | G06F 3/04883 345/173 |
| 2014/0157101 A1* | 6/2014 | Hogan ................. | G06F 40/177 715/227 |
| 2014/0351761 A1* | 11/2014 | Bae ..................... | G06F 3/04842 715/835 |
| 2015/0130740 A1* | 5/2015 | Cederlund ........... | G02B 27/017 345/173 |
| 2016/0132222 A1* | 5/2016 | Yoo ........................ | G06F 3/016 715/763 |
| 2016/0139797 A1* | 5/2016 | Baek ..................... | G06F 3/0317 345/173 |
| 2016/0357358 A1* | 12/2016 | Forster ................. | G06F 3/0481 |
| 2017/0357418 A1* | 12/2017 | Dunn ..................... | G06F 9/451 |
| 2020/0057555 A1* | 2/2020 | Walkin ................. | G06F 3/0482 |

FOREIGN PATENT DOCUMENTS

| | | |
|---|---|---|
| JP | 2016038622 A | 3/2016 |
| KR | 101250821 B1 | 4/2013 |
| KR | 10-2014-0013519 A | 2/2014 |
| KR | 10-1452053 B1 | 10/2014 |
| KR | 10-2014-0137996 A | 12/2014 |
| KR | 10-2015-0039976 A | 4/2015 |
| KR | 10-2016-0025764 A | 3/2016 |
| KR | 10-2016-0057651 A | 5/2016 |
| WO | 2015/126196 A1 | 8/2015 |

OTHER PUBLICATIONS

ISA/KR, "International Search Report and Written Opinion of the International Searching Authority," International Application No. PCT/KR2017/012366, dated Mar. 21, 2018, 11 pages.

* cited by examiner

METHOD FOR ADJUSTING SCREEN SIZE AND ELECTRONIC DEVICE THEREFOR

CROSS-REFERENCE TO RELATED APPLICATIONS

This application is a 371 National Stage of International Application No. PCT/KR2017/012366 filed Nov. 3, 2017, which claims priority to Korean Patent Application No. 10-2016-0163681 filed Dec. 2, 2016, the disclosures of which are herein incorporated by reference in their entirety.

BACKGROUND

Technical Field

Various embodiments of the disclosure relate to an apparatus and a method for adjusting a size of a screen in an electronic device.

Background Art

With the development of information and communication technology and semiconductor technology, electronic devices are developing into multimedia devices providing various multimedia services. For example, the multimedia services may include at least one of a voice call service, a message service, a broadcasting service, a wireless Internet service, a camera service, and a music replay service.

As multimedia services are increasingly used, amounts of information to be processed in electronic devices and amounts of information to be displayed are increasing. Accordingly, an electronic device may be provided with a touch screen to enhance space utilization and to increase the size of a display.

SUMMARY

When an electronic device is provided with a touch screen, the electronic device may perform input and display of information through the touch screen. Accordingly, the electronic device may increase the size of a display region by using a region where a separate input device, such as a keypad, is to be arranged, as the display region through the touch screen.

As the size of the display region of the electronic device increases, the user of the electronic device may have difficulty in controlling all information displayed on the display region with his/her hand holing the electronic device, which may cause inconvenience.

Various embodiments of the disclosure provide an apparatus and a method for adjusting a size of a screen in an electronic device.

Various embodiments of the disclosure provide an apparatus and a method for adjusting a size of a screen based on a touch input of a reference region in an electronic device.

An electronic device according to various embodiments of the disclosure may include a touch screen and a processor, and the processor may control to: detect a touch input from a reference region which is set in at least a partial region of the touch screen; when a movement of the touch input is detected, activate a screen adjustment mode based on a movement range of the touch input; when the touch input is maintained, adjust a screen size of the touch screen based on a movement distance of the touch input; and, when the touch input is released, set a screen size at the time that the touch input is released as a screen size of the screen adjustment mode.

An operation method of an electronic device according to various embodiments of the disclosure may include: detecting a touch input from a reference region which is set in at least a partial region of a touch screen of the electronic device; when a movement of the touch input is detected, activating a screen adjustment mode based on a movement range of the touch input; when the touch input is maintained, adjusting a screen size of the touch screen based on a movement distance of the touch input; and, when the touch input is released, setting a screen size at the time that the touch input is released as a screen size of the screen adjustment mode.

The electronic device and the operation method therefor according to various embodiments convert into the screen adjustment mode when a movement of a touch input detected in a reference region set in at least a partial region of the display goes beyond a reference range, and set the screen size of the screen adjustment mode based on a movement distance and direction of the touch input, such that the user of the electronic device can easily control at least one piece of information displayed on the display region with user's one hand.

The electronic device and the operation method therefor according to various embodiments set a screen adjustment variable (for example, a reference range, a scale factor) to correspond to the hand size of a user, based on a screen size setting history of the screen adjustment mode, such that a screen adjustment service corresponding to characteristics (for example, hand size) of the user can be provided.

DETAILED DESCRIPTION

Figure 1:
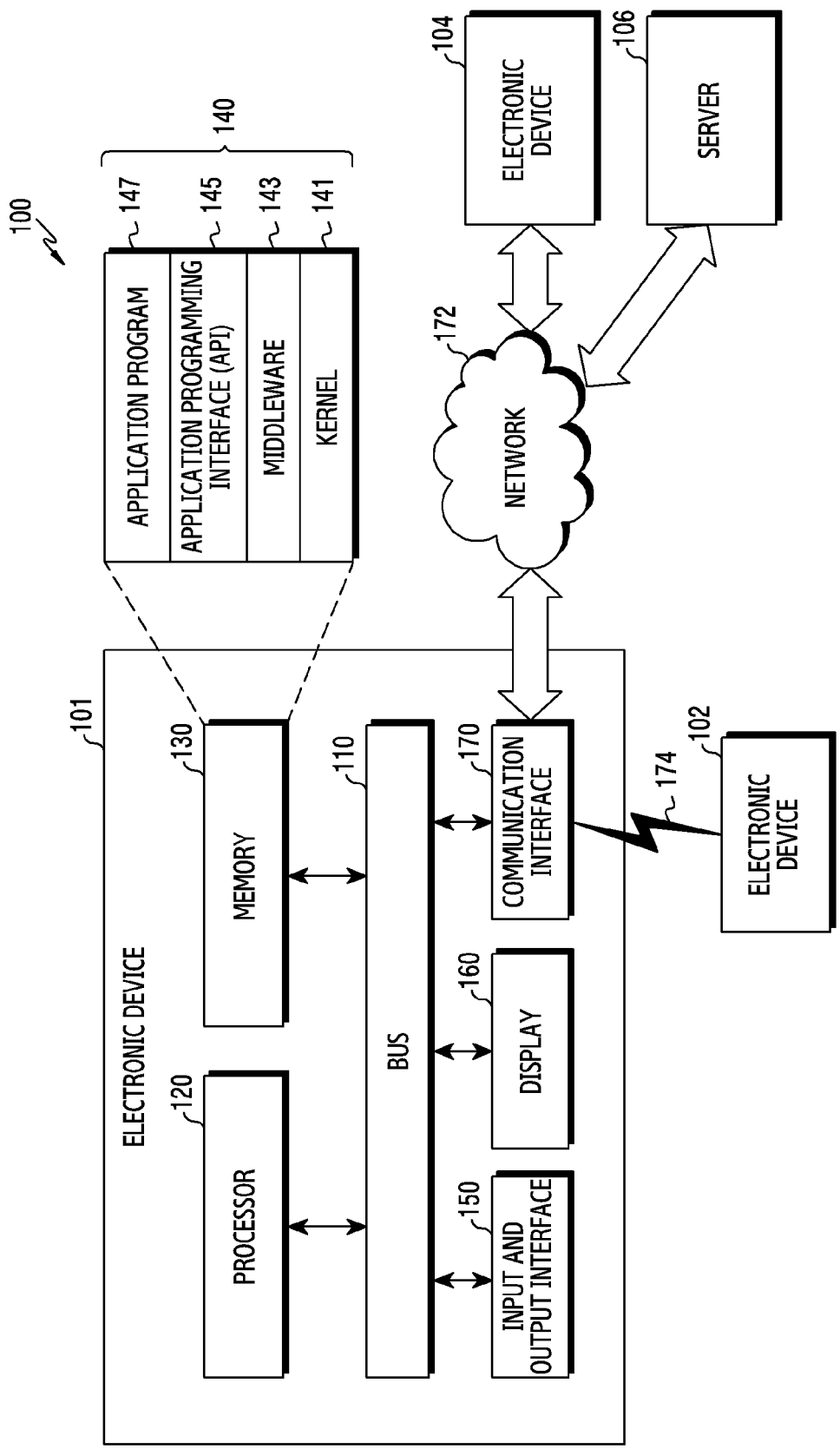
FIG. 1 is a view illustrating an electronic device in a network environment according to various embodiments of the disclosure.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context.

In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit).

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MM), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 illustrates an electronic device 101 in a network environment 100 according to various embodiments of the disclosure.

Referring to FIG. 1, the electronic device 101 may include a bus 110, a processor 120, a memory 130, an input and output interface 150, a display 160, and a communication interface 170. In some embodiments, the electronic device 101 may omit at least one of the elements or may further include other element(s).

The bus 110 may interconnect the above-described elements 120 to 170, and may include a circuit for transmitting communications (for example, a control message and/or data) among the above-described elements.

The processor 120 may include one or more of a central processing unit (CPU), an application processor (AP), a communication processor (CP), or an image signal processor (SIP). For example, the processor 120 may perform an operation or data processing associated with control and/or communication of at least one other element(s) of the electronic device 101.

According to an embodiment, the processor 120 may control to adjust a size of a screen displayed on the display 160 based on a touch input of a reference region. For example, the processor 120 may detect a touch input in a reference region which is set in at least a partial region of the display 160, through a touch sensor. For example, the reference region may be included in at least part of a corner region of the display 160, and may be formed in the form of a figure such as a polygon, a circle, a fan shape, an oval, or the like. When a movement (for example, drag) of the touch input detected in the reference region is detected, the processor 120 may determine whether the movement of the touch input goes beyond a reference range. For example, the reference range may include at least part of the corner region of the display 160 that is set to prevent a false operation caused by the movement of the touch input. When the movement of the touch input goes beyond the reference range, the processor 120 may activate a screen adjustment mode. The processor 120 may control the display 160 to adjust the size of the screen based on a movement direction and a movement distance of the touch input, detected through the touch sensor, in the activation state of the screen adjustment mode. Additionally or alternatively, when the screen adjustment mode is activated, the processor 120 may control the display 160 to change the screen size of the display 160 to a reference size. The processor 120 may control the display 160 to adjust the size of the screen set to the reference size, based on the movement direction and distance of the touch input. For example, the reference size may include a pre-defined certain size included between a minimum size and a maximum size of the screen which are settable in the screen adjustment mode.

According to an embodiment, the processor 120 may set a scale factor for adjusting the size of the screen to correspond to a region where the movement of the touch input is detected (detection region). For example, when a length of the display 160 in the horizontal direction, a length in the vertical direction, and a length in the diagonal direction are different, the processor 120 may split the display 160 into a plurality of detection regions (for example, three detection regions) for identifying a movement direction of at least one touch input with reference to the reference region. The processor 120 may set the scale factor for adjusting the size of the screen based on a detection region including a touch point at the time that the screen adjustment mode is activated. For example, when the length of the display 160 in the horizontal direction is the shortest, the processor 120 may set a first scale factor of a detection region corresponding to the horizontal direction to be relatively lower than in the other directions. Specifically, the processor 120 may set a ratio between the first scale factor and a movement distance of a touch input to 1. For example, the processor 120 may set a second scale factor of a detection region corresponding to the diagonal direction which is the longest length of the display 160 to be relatively higher than in the other directions. For example, the processor 120 may set a third scale factor of a detection region corresponding to the vertical direction on the display 160 to be relatively higher than in the horizontal direction, and to be relatively lower than in the diagonal direction.

According to an embodiment, when the scale factor is set based on the region where the movement of the touch input is detected (detection region), the processor 120 may maintain the corresponding scale factor while the corresponding touch input is maintained. For example, when a touch point at the time that the screen adjustment mode is activated is included in the detection region corresponding to the horizontal direction, the processor 120 may set the scale factor for adjusting the screen size to the first factor scale. The processor 120 may control the display 160 to adjust the size of the screen based on the first scale factor until the touch input is released. That is, even when the detection region including the touch point is changed according to the movement of the touch input, the processor 120 may maintain the scale factor for adjusting the screen size as the first scale factor.

According to an embodiment, the processor 120 may change the scale factor to correspond to a region where the movement of the touch input is detected (detection region). For example, when a touch point at the time that the movement of the touch input goes beyond the reference range is included in the detection region corresponding to the vertical direction, the processor 120 may set the scale factor for adjusting the size of the screen to the third scale factor. In this case, the processor 120 may control the display 160 to adjust the size of the screen based on the movement direction and distance of the touch input and the third scale factor. When a touch point enters the detection region corresponding to the diagonal direction by the movement of the touch input, the processor 120 may change the scale factor for adjusting the size of the screen to the second scale factor. Accordingly, the processor 120 may control the display 160 to adjust the size of the screen based on the movement direction and distance of the touch input and the second scale factor.

According to an embodiment, when the touch input detected in the reference region is released, the processor 120 may set the screen size at the time that the touch input is released to a size for displaying a service screen in the screen adjustment mode. For example, when the movement of the touch input detected in the reference region goes beyond the reference range, the processor 120 may control the display 160 to adjust the size of the screen based on at least one of the movement distance of the touch input, the movement direction of the touch input, and the scale factor. When the corresponding touch input is released, the processor 120 may detect a screen size which is set at the time that the touch input is released. When the screen size at the time that the touch input is released is smaller than or equal to the reference size, the processor 120 may set the corresponding screen size to the size for displaying the service screen in the screen adjustment mode. When the screen size at the time that the touch input is released exceeds the reference size, the processor 120 may restore the screen size to an original size. That is, when the screen size at the time that the touch input is released exceeds the reference size, the processor 120 may inactivate the screen adjustment mode. For example, the original size may include a screen size that has been before the size of the screen is changed by the screen adjustment mode.

According to an embodiment, the processor 120 may set a screen adjustment variable based on movement information of the touch input for adjusting the size of the screen in the screen adjustment mode. For example, the processor 120 may control the memory 130 to accumulate movement information of the touch input for adjusting the size of the screen and to store the information. The processor 120 may estimate a size of user's hand based on the movement information of the touch input which is accumulated more than a reference number of times. The processor 120 may refine the screen adjustment variable to correspond to the size of the user's hand. For example, the screen adjustment variable may include at least one of the reference range and the scale factor.

According to an embodiment, the processor 120 may set a screen adjustment pattern based on size information for displaying the service screen in the screen adjustment mode. For example, the processor 120 may control the memory 130 to accumulate screen size information set by the movement of the touch input in each detection region, and to store the information. The processor 120 may estimate a screen adjustment pattern (for example, screen size) that is preferred by the user according to a direction corresponding to each detection region, based on the screen size information which is accumulated more than a reference number of times. When the movement of the touch input detected in the reference region goes beyond the reference range, the processor 120 may identify a detection region corresponding to the touch input. The processor 120 may control the display 160 to adjust the size of the screen based on the screen adjustment pattern of the detection region.

The memory 130 may include a volatile and/or nonvolatile memory. For example, the memory 130 may store a command or data related to at least one other element of the electronic device 101. According to an embodiment, the memory 130 may store at least one of the movement information of the touch input for adjusting the screen in the screen adjustment mode, and the changed screen size information corresponding to the detection region.

According to an embodiment, the memory 130 may store software and/or a program 140. For example, the program 140 may include a kernel 140, middleware 143, an application programming interface (API) 145, or an application program (or "application") 147. At least part of the kernel 141, the middleware 143, or the API 145 may be referred to as an operating system (OS).

The input and output interface 150 may perform the role of an interface to transmit a command or data inputted from the user or another external device to other element(s) of the electronic device 101. For example, the input and output interface 150 may include at least one physical button such as a home button, a power button, and a volume control button. For example, the input and output interface 150 may include a speaker for outputting an audio signal, and a microphone for collecting an audio signal.

The display 160 may display various contents (for example, a text, an image, a video, an icon, and/or a symbol, etc.) for the user. For example, the display 160 may include a liquid crystal display (LCD), a light emitting diode (LED) display, an organic LED (OLED) display, or a micro-electro mechanical system (MEMS) display, or an electronic paper display.

According to an embodiment, the display 160 may include a display panel and a touch panel. For example, the display 160 may receive a touch, a gesture, an approach, or a hovering input using an electronic pen or a part of the user's body through the touch panel. For example, the display panel and the touch panel may overlap each other entirely or at least in part.

The communication interface 170 may establish communication between the electronic device 101 and an external device (for example, a first external electronic device 102, a second external electronic device 104, or a server 106). For example, the communication interface 170 may be connected with a network 172 through wireless communication or wired communication to communicate with an external device (for example, the second external electronic device 104 or the server 106).

According to an embodiment, the wireless communication may include cellular communication using at least one of long-term evolution (LTE), LTE Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include short-range communication 174 using at least one of wireless fidelity (WiFi), Bluetooth, Bluetooth low energy (BLE), Zigbee, near field communication (NFC), magnetic secure transmission, radio frequency (RF), or a body area network (BAN). According to an embodiment, the wireless communication may include a global navigation satellite system (GNSS). The GNSS may be, for example, a global positioning system (GPS), a global navigation satellite system (Glonass), a BeiDou navigation satellite system (BeiDou) or the European global satellite-based navigation system (Galileo). Hereinafter, "GPS" and "GNSS" may be interchangeably used in the disclosure. According to an embodiment, the wired communication may include at least one of a universal serial bus (USB), a high-definition multimedia interface (HDMI), a recommended standard-232 (RS-232), power line communication, or a plain old telephone service (POTS). The network 172 may include at least one of telecommunications networks, for example, a computer network (for example, local area network (LAN) or wide area network (WAN)), an internet, or a telephone network.

Figure 2:
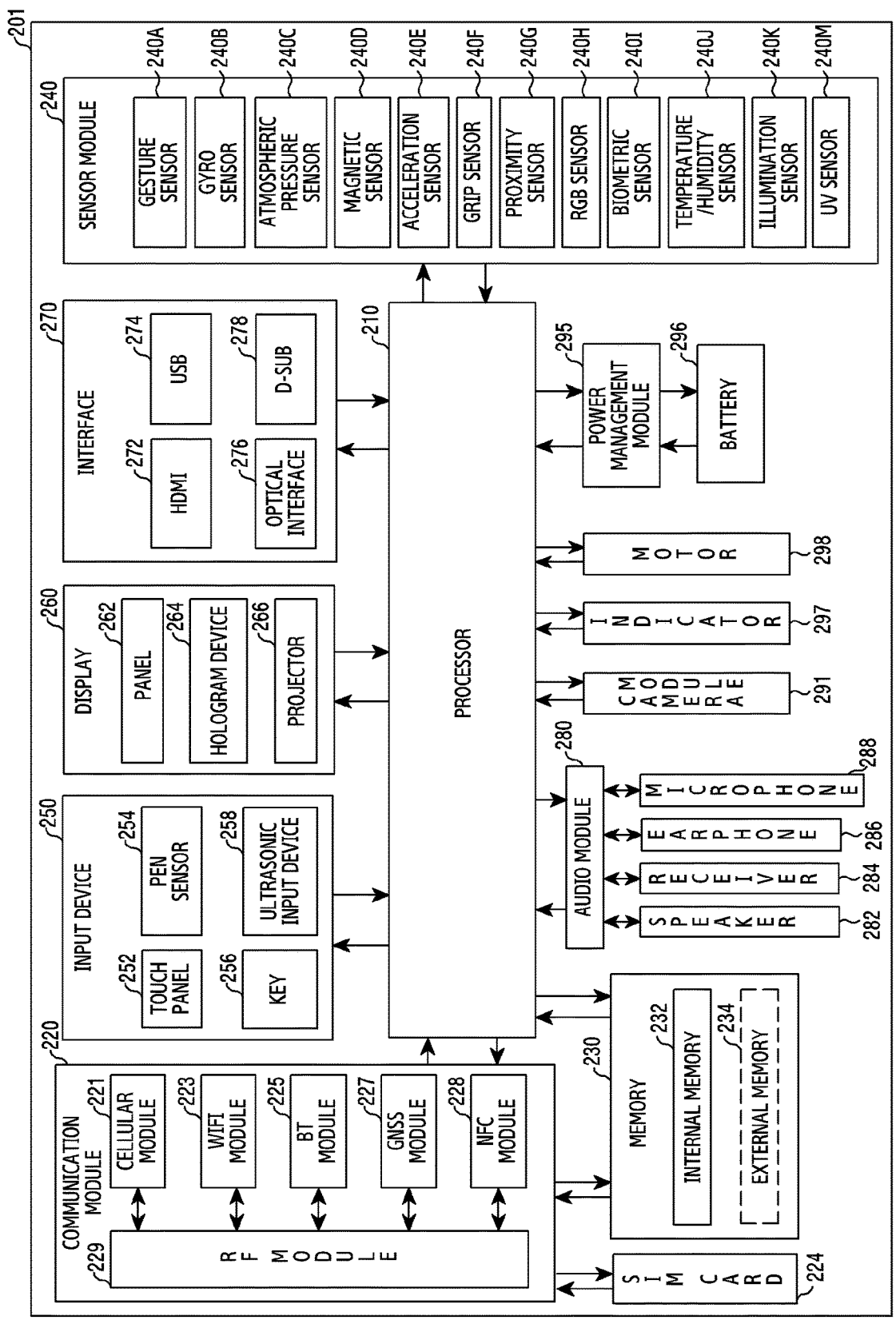
FIG. 2 is a block diagram of an electronic device according to various embodiments of the disclosure.

FIG. 2 illustrates a block diagram of an electronic device 201 according to various embodiments. The electronic device 201 may include an entirety or a part of the electronic device 101 illustrated in FIG. 1. The electronic device 201 may include one or more processors (for example, AP) 210, a communication module 220, a subscriber identity module 224, a memory 230, a sensor module 240, an input device 250, a display 260, an interface 270, an audio module 280, a camera module 291, a power management module 295, a battery 296, an indicator 297, and a motor 298.

The processor 210 may drive an operating system or an application program to control a plurality of hardware or software elements connected to the processor 210, and may perform various data processing or computation. The processor 210 may be implemented with a System on Chip (SoC), for example. According to an embodiment, the processor 210 may further include a graphic processing unit (GPU) and/or an image signal processor. The processor 210 may include at least part (for example, a cellular module 221) of the elements illustrated in FIG. 2. The processor 210 may load and process a command or data, which is received from at least one of the other elements (for example, a nonvolatile memory) in a volatile memory, and may store resulting data at a nonvolatile memory.

According to an embodiment, the processor 120 may control to adjust a size of a screen displayed on the display 260, based on a touch input of a reference region set in at least a partial region of the display 260.

The communication module 220 may have the same or similar configuration to the communication interface 170 of FIG. 1. The communication module 220 may include, For example, a cellular module 221, a Wi-Fi module 223, a Bluetooth module 225, a GNSS module 227, an NFC module 228, and a radio frequency (RF) module 229.

The cellular module 221 may provide, for example, a voice call, a video call, a text service, or an Internet service through a communication network. According to an embodiment, the cellular module 221 may perform identification and authentication of the electronic device 201 within the communication network by using the subscriber identification module 224 (e.g., a SIM card). According to an embodiment, the cellular module 221 may perform at least some of the functions that may be provided by the processor 210. According to an embodiment, the cellular module 221 may include a CP.

According to an embodiment, at least some (e.g., two or more) of the cellular module 221, the Wi-Fi module 223, the Bluetooth module 225, the GNSS module 227, or the NFC module 228 may be included in one integrated chip (IC) or IC package.

The RF module 229 may transmit/receive, for example, a communication signal (e.g., an RF signal). The RF module 229 may include, for example, a transceiver, a power amp module (PAM), a frequency filter, a low noise amplifier (LNA), or an antenna. According to other embodiment, at least one of the cellular module 221, the Wi-Fi module 223, the Bluetooth module 225, the GNSS module 227, or the NFC module 228 may transmit/receive an RF signal through a separate RF module. The subscriber identification module 224 may include, for example, a card including a subscriber identification module or an embedded SIM, and may include unique identification information (e.g., integrated circuit card identifier (ICCID)) or subscriber information (e.g., international mobile subscriber identity (IMSI)).

The memory 230 (e.g., the memory 130 of FIG. 1) may include, for example, an internal memory 232 or an external memory 234. The internal memory 232 may include at least one of, for example, a volatile memory (e.g., a dynamic random access memory (DRAM), a static RAM (SRAM), or a synchronous dynamic RAM (SDRAM)) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive, for example, a compact flash (CF), secure digital (SD), micro-SD, mini-SD, extreme digital (xD), multi-media card (MMC) or a memory stick. The external memory 234 may be functionally or physically coupled to the electronic device 201 via various interfaces.

The sensor module 240 may, for example, measure a physical quantity or detect an operation state of the electronic device 201, and thus convert the measured or detected information into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment, the electronic device 201 may further include, as part of or separately from the processor 210, a processor configured to control the sensor module 240, and thus may control the sensor module 240 while the processor 210 is sleeping. For example, the temperature/humidity sensor 240J may include a plurality of temperature sensors disposed at different positions.

The input device 250 may include, for example, a touch panel 252, a (digital) pen sensor 254, a key 256, or an ultrasonic input unit 258. The touch panel 252 may use at least one of, for example, an electrostatic type, a pressure-sensitive type, or an ultrasonic type. In addition, the touch panel 252 may further include a control circuit. The touch panel 252 may further include a tactile layer, to provide the user with a tactile reaction. The (digital) pen sensor 254 may, for example, be a part of the touch panel or include a separate recognition panel. The key 256 may include, for example, a physical button, an optical key, or a keypad. The ultrasonic input device 258 may detect ultrasonic waves generated by an input tool through a microphone (e.g., a microphone 288), and identify data corresponding to the detected ultrasonic waves.

The display 260 (e.g., the display 160) may include a panel 262, a hologram device 264, a projector 266, and/or a control circuit for controlling them. The panel 262 may be implemented in, for example, a flexible, transparent, or wearable manner. The panel 262 may be configured with one or more modules with the touch panel 252. The hologram device 264 may display a stereoscopic image in the air by using an interference of light. The projector 266 may display an image by projecting a light beam onto a screen. The screen may be located, for example, inside or outside the electronic device 201. The interface 270 may include, for example, an HDMI 272, a USB 274, an optical communication interface 276, or a d-subminiature (D-sub) 278. The interface 270 may be included, for example, in the communication interface 170 of FIG. 1. Additionally or alternatively, the interface 270 may include, for example, a mobile high-definition link (MHL) interface, SD/multi-media card (MMC) interface, or Infrared Data Association (IrDA) interface.

The audio module 280 may, for example, bilaterally convert a sound and an electric signal. At least some components of the audio module 280 may be included, for example, in the input/output interface 145 of FIG. 1. The audio module 280 may process sound information which is inputted or outputted through, for example, a speaker 282, a receiver 284, an earphone 286, or the microphone 288. The camera module 291 is, for example, a device capable of capturing still images and moving images, and, according to an embodiment, may include one or more image sensors (e.g., a front sensor or a rear sensor), a lens, an ISP, or a flash (e.g., an LED or a xenon lamp). The power management module 295 may, For example, manage power of the electronic device 201. The power management module 295 may include a power management integrated circuit (PMIC), a charger IC, or a battery or fuel gauge. The PMIC may have a wired and/or wireless charging method. The wireless charging method may include, for example, a magnetic resonance method, a magnetic induction method, or an electromagnetic method, and may further include an additional circuit for the wireless charging, for example, a coil loop, a resonant circuit, or a rectifier circuit. The battery gauge may measure, for example, the remaining capacity, a voltage, current, or temperature of the battery 296 during charging. The battery 296 may include, for example, a rechargeable battery and/or a solar battery.

The indicator 297 may display a specific state of the electronic device 201 or part thereof (e.g., the processor 210), for example, a booting state, a message state, or a charging state. The motor 298 may convert electrical signals into mechanical vibration and generate a vibration or haptic effect. The electronic device 201 may include a mobile TV supporting device (e.g., a GPU) for processing media data according to standards, for example, digital multimedia broadcasting (DMB), digital video broadcasting (DVB), or mediaFlo™. Each of the above-described components may be configured with one or more components, and the name of a corresponding component may vary according to a type of the electronic device. In various embodiments, the electronic device (e.g., the electronic device 201) may be configured to omit some components, to include an additional component, or to combine some of the components as one entity, wherein functions of previous corresponding components are performed identically.

Figure 3:
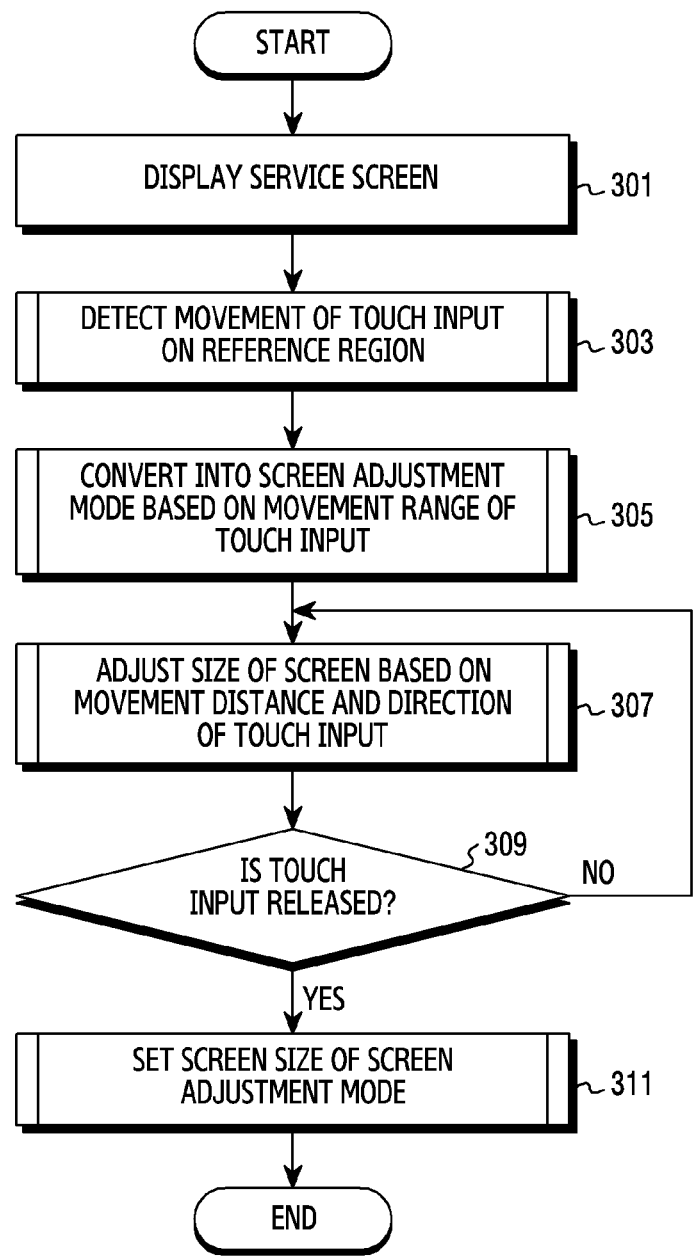
FIG. 3 is a flowchart for adjusting a screen size in an electronic device according to various embodiments of the disclosure.

FIG. 3 is a flowchart for adjusting a screen size in an electronic device according to various embodiments of the disclosure. FIGS. 6A to 6E illustrate screen configurations for changing a screen to a reference size when converting into a screen adjustment mode in an electronic device according to various embodiments of the disclosure. In the following description, the electronic device may include the electronic device 101 of FIG. 1 or at least part of the electronic device 101 (for example, the processor 120).

Figure 6A:
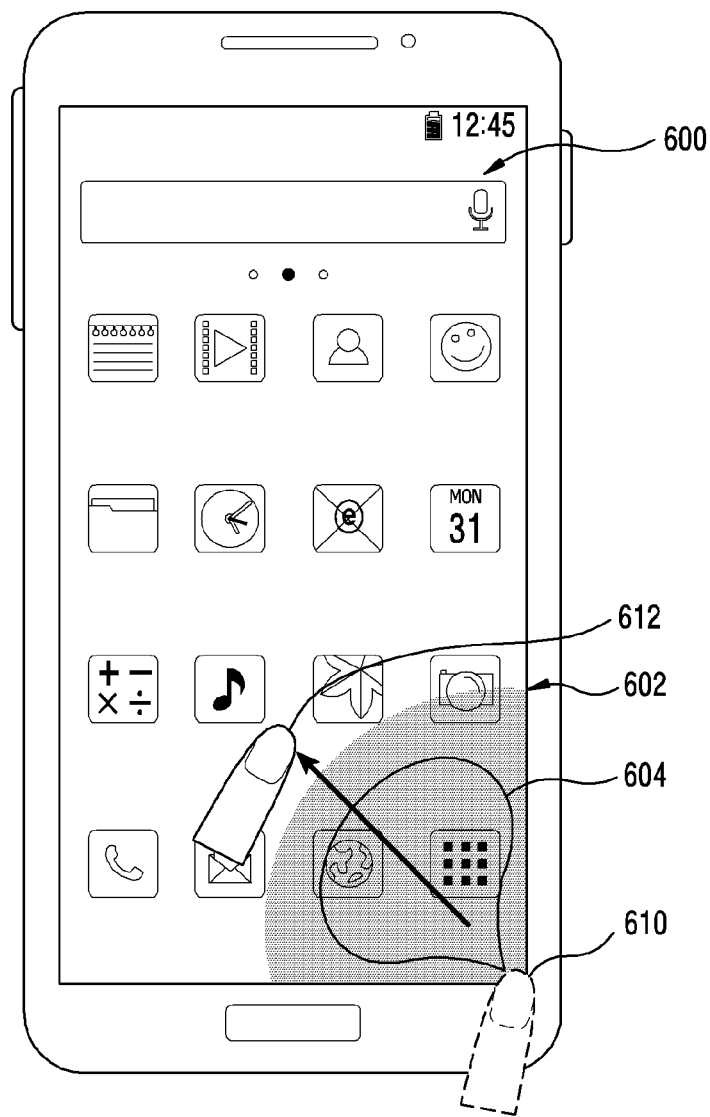
FIGS. 6A, 6B, 6C, 6D and 6E are views illustrating screen configurations for changing a screen size to a reference size when converting into a screen adjustment mode in an electronic device according to various embodiments of the disclosure.

Referring to FIG. 3, in operation 301, the electronic device may display a service screen on a display. For example, the processor 120 may control the display 160 to display an execution screen of an application which is being executed in the electronic device 101. For example, the execution screen of the application may include a home screen 600 including at least one icon as shown in FIG. 6A. The at least one icon may include an icon of at least one application installed at the electronic device 101.

In operation 303, the electronic device may detect a touch input in a reference region which is set in at least a partial region of the display. For example, the processor 120 may detect a touch input on a reference region 604 which is set in at least part of a lower corner region of the display 160 through a touch sensor (touch panel), as shown in FIG. 6A. For example, the reference region 604 may be set in both corner regions of the lower end of the display 160, or may be selectively set in any one corner region based on a grip shape (for example, a left-handed grip or a right-handed grip) of the user on the electronic device 101.

In operation 305, the electronic device may convert into a screen adjustment mode based on a movement range of the touch input detected through the reference region. For example, the processor 120 may detect a touch input 610 on the reference region 604 which is set in the right corner of the display 160 through the touch sensor as shown in FIG. 6A. When a touch point following a movement 612 of the touch input 610 goes beyond a reference range 602 based on the movement 612 of the touch input 610, the processor 120 may convert the operation mode of the electronic device 101 into the screen adjustment mode. For example, the reference range 602 may be set to a range including the reference region 604.

Figure 6B:
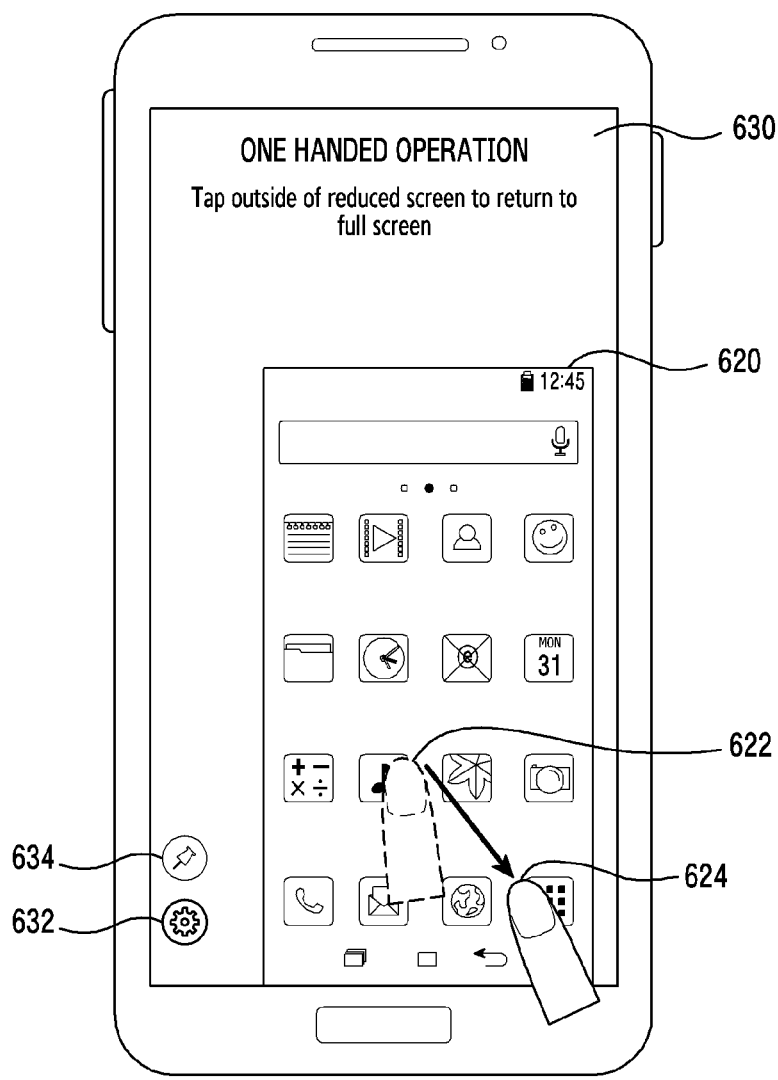
Figure 6C:
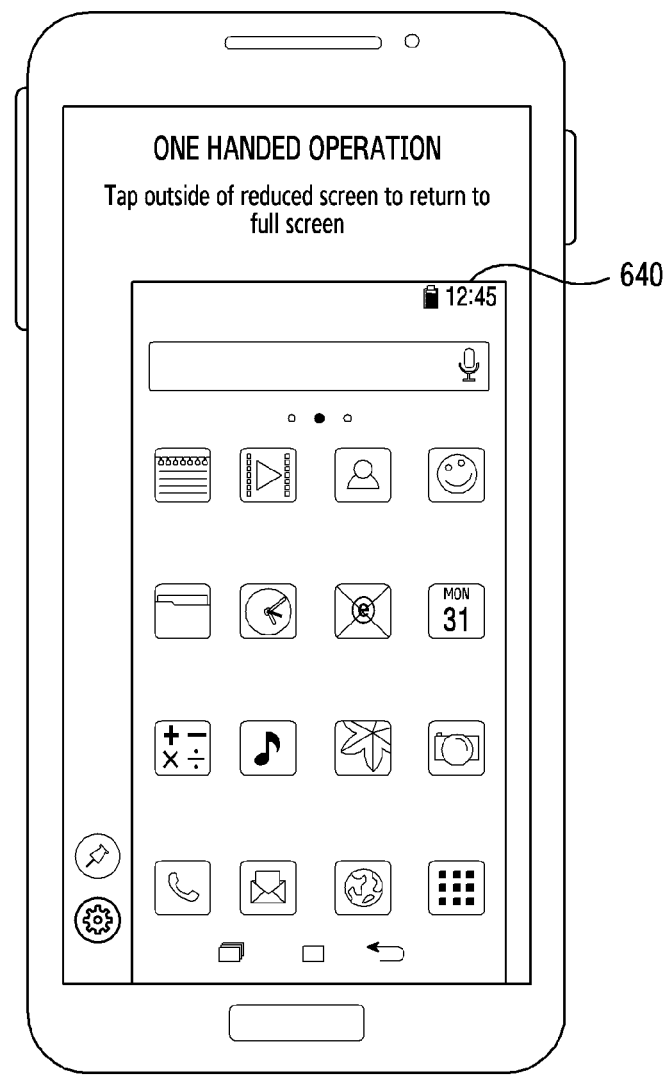
Figure 6D:
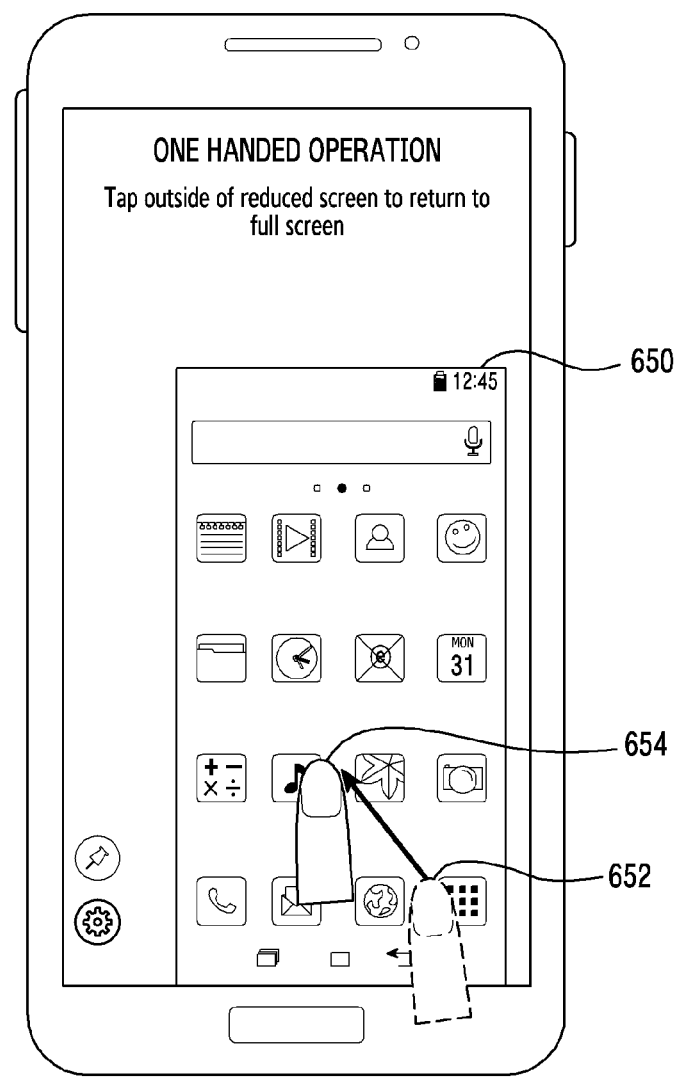

When the electronic device operates in the screen adjustment mode, the electronic device may adjust the size of a screen (display region) for displaying the service screen on the display, based on a movement distance and a movement direction of the touch input in operation 307. For example, when the operation mode of the electronic device 101 is converted into the screen adjustment mode, the processor 120 may determine whether to enlarge or reduce the screen size, based on the movement direction of the touch input. For example, when a movement (622→624) of the touch input from the reference range to the reference region is detected as shown in FIG. 6B, the processor 120 may determine to enlarge the size of the screen. For example, when a movement (652→654) of the touch input from the reference region to the reference range (left direction) is detected as shown in FIG. 6D, the processor 120 may determine to reduce the size of the screen. The processor 120 may control the display 160 to enlarge or reduce the size of the screen based on the movement distance of the touch input. Additionally or alternatively, the processor 120 may detect a scale factor corresponding to a region where a movement of the touch input is detected (detection region). The processor 120 may control the display 160 to enlarge or reduce the size of the screen based on the movement distance of the touch input and the scale factor. For example, the size of the screen may include the size of the display region on which the service screen is displayed in the display 160. Accordingly, the display 160 may adjust the size of the service screen displayed on the display 160 to correspond to the size of the screen adjusted under control of the processor 120.

In operation 309, the electronic device may determine whether the touch input detected in the reference region is released. For example, the processor 120 may determine whether the touch input (for example, the touch input detected in operation 303) detected in the reference region is released through the touch sensor.

When the touch input is not released and a movement of the touch input is detected, the electronic device may adjust the size of the screen (display region) for displaying the service screen on the display, based on a movement distance and a movement direction of the touch input in operation 307.

When the touch input is released, the electronic device may set the screen size at the time that the touch input is released to the size for displaying the service screen in the screen adjustment mode in operation 311. For example, when the screen adjustment mode of the electronic device 101 is activated, the processor 120 may control the display 160 to adjust the size of the screen based at least one of the movement distance and the movement direction of the touch input, and the scale factor (operation 307). When the touch input is released (operation 309), the processor 120 may compare the screen size set at the time that the touch input is released, and a reference size. When the screen size detected at the time that the touch input is released is smaller than or equal to the reference size, the processor 120 may set the corresponding screen size as the screen size of the screen adjustment mode. When the screen size detected at the time that the touch input is released exceeds the reference size, the processor 120 may control the screen adjustment mode to be inactivated. That is, the processor 120 may control the display 160 to restore the size (screen size) for displaying the service screen on the display 160 to an original size.

Figure 6E:
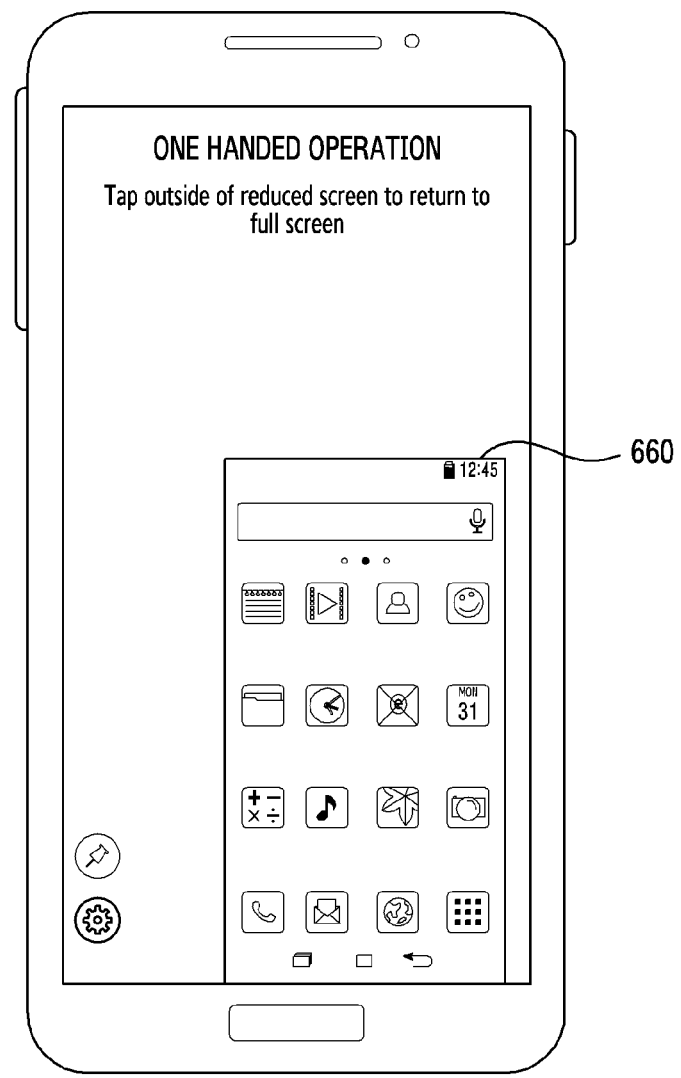

According to an embodiment, when the screen size of the screen adjustment mode is set, the electronic device may perform a function corresponding to a touch input of the service screen whose size is changed (or reduced) to correspond to the screen size. For example, when the screen size of the screen adjustment mode is set as shown in FIG. 6E, the processor 120 may determine whether a touch input on a service screen 660 reduced to correspond to the screen size is detected. When a touch input on a specific icon included in the service screen 660 is detected, the processor 120 may perform a function corresponding to the specific icon. Specifically, when a touch input on an application icon included in the service screen 660 is detected, the processor 120 may execute the application corresponding to the corresponding icon. For example, the processor 120 may control the display 160 to display an execution screen of the application in a size corresponding to the screen size of the screen adjustment mode. For example, when the application is executed, the processor 120 may control the display 160 to restore the screen size to the original size and to display the execution screen of the application. Additionally or alternatively, when a screen size fixing menu 634 of FIG. 6B is activated, the processor 120 may maintain the screen size. That is, when the screen size fixing menu 634 is activated, the processor 120 may control the display 160 to display the execution screen of the application in a size corresponding to the screen size of the screen adjustment mode.

According to various embodiments of the disclosure, the electronic device may set the screen size of the screen adjustment mode by using another display layer overlapping the service screen displayed on the display, based on movement information of the touch input detected in the reference region. For example, when the screen adjustment mode of the electronic device 101 is activated, the processor 120 may control the display 160 to display a screen size setting screen on a second display layer which overlaps a first display layer of the service screen displayed on the display 160. The processor 120 may control the display 160 to adjust the size of the screen displayed on the second display layer based on at least one of a movement distance and a movement direction of the touch input, and a scale factor. The processor 120 may control the display 160 to adjust the size of the service screen displayed on the first display layer to correspond to the size set on the second display layer at the time that the touch input is released.

Figure 4:
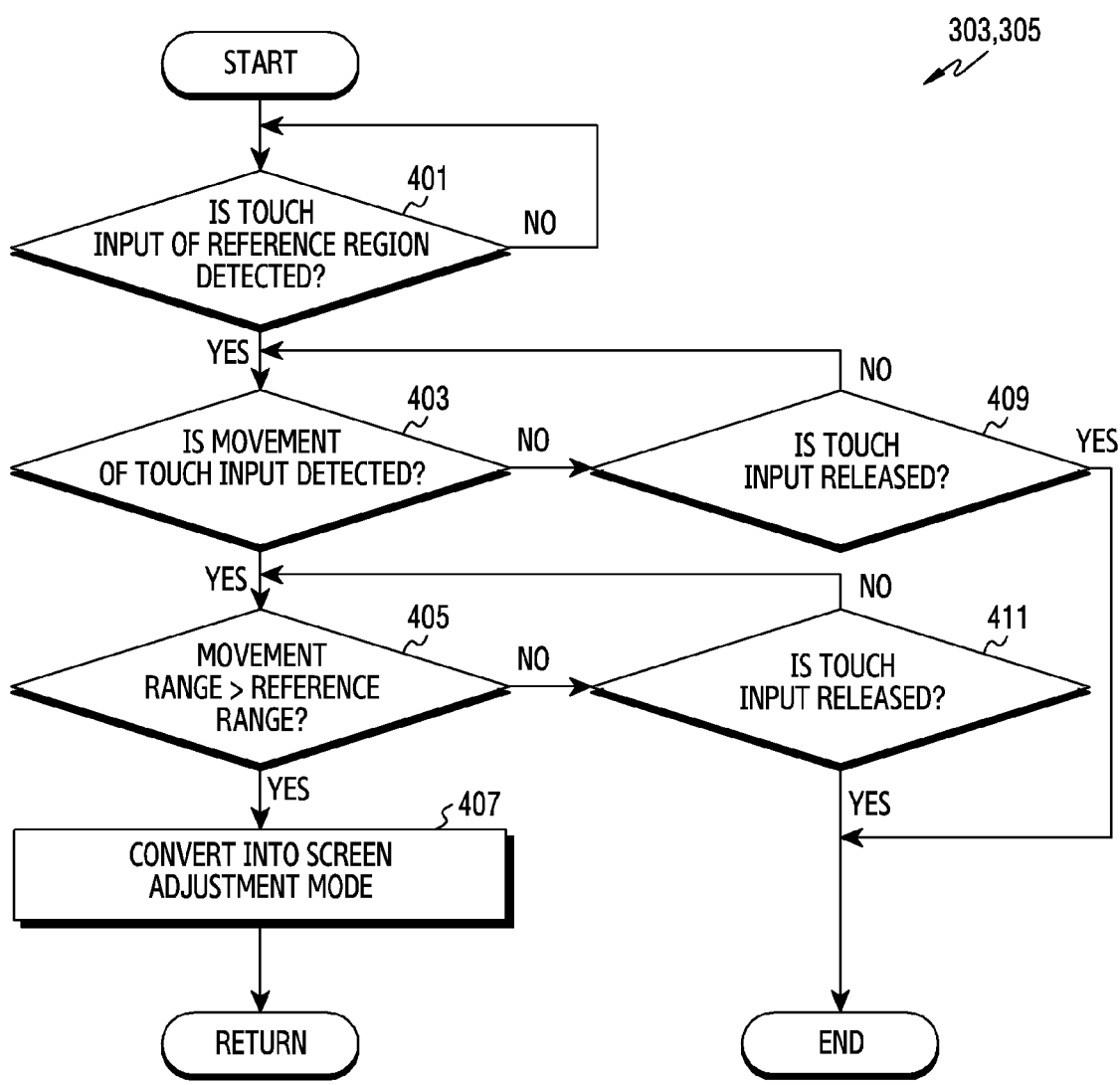
FIG. 4 is a flowchart for converting into a screen adjustment mode in an electronic device according to various embodiments of the disclosure.

FIG. 4 illustrates a flowchart for converting into a screen adjustment mode in an electronic device according to various embodiments of the disclosure. Hereinafter, the operation for converting into the screen adjustment mode in operations 303 to 305 of FIG. 3 will be described. In the following description, the electronic device may include the electronic device 101 of FIG. 1 or at least part (for example, the processor 120) of the electronic device 101.

Referring to FIG. 4, in operation 401, the electronic device may determine whether a touch input included in a reference region set in at least a partial region of the display is detected. For example, the processor 120 may determine whether the touch input 610 on the reference region 604 set in the right lower corner region of the display 160 is detected through the touch sensor (touch panel) as shown in FIG. 6A.

When the touch input of the reference region is detected, the electronic device may determine whether a movement of the corresponding touch input is detected in operation 403. For example, the movement of the touch input may include a drag input.

When the movement of the touch input detected in the reference region is not detected, the electronic device may determine whether the corresponding touch input is released in operation 409. For example, the processor 120 may determine whether a user's contact with the display 160 is released through the touch sensor.

When the touch input is maintained, the electronic device may determine whether a movement of the corresponding touch input is detected again in operation 403.

When the movement of the touch input detected in the reference region is detected, the electronic device may determine whether the range of the movement of the touch input goes beyond a reference range in operation 405. For example, the processor 120 may determine whether the touch input 610 detected in the reference region 604 goes beyond the reference range 602 by the movement 612 of the touch input 610 as shown in FIG. 6A. For example, the range of the movement of the touch input may include a distance from a reference point (for example, a right corner) included in the reference region 604 to a touch point changed by the movement 612 of the touch input 610.

When the range of the movement of the touch input detected in the reference region does not go beyond the reference range, the electronic device may determine whether the corresponding touch input is released in operation 411.

When the touch input is maintained, the electronic device may determine whether a movement range of the corresponding touch input goes beyond the reference range again in operation 405.

When the movement range of the touch input detected in the reference region goes beyond the reference range, the electronic device may convert the operation mode of the electronic device into the screen adjustment mode in operation 407. For example, when the movement 612 of the touch input 610 detected in the reference region 604 goes beyond the reference range 602 as shown in FIG. 6A, the processor 120 may activate the screen adjustment mode of the electronic device 101.

When the touch input is released before the operation mode of the electronic device is converted into the screen adjustment mode (for example, operation 409 or operation 411), the electronic device may determine that the size of the screen is not adjusted.

Figure 5:
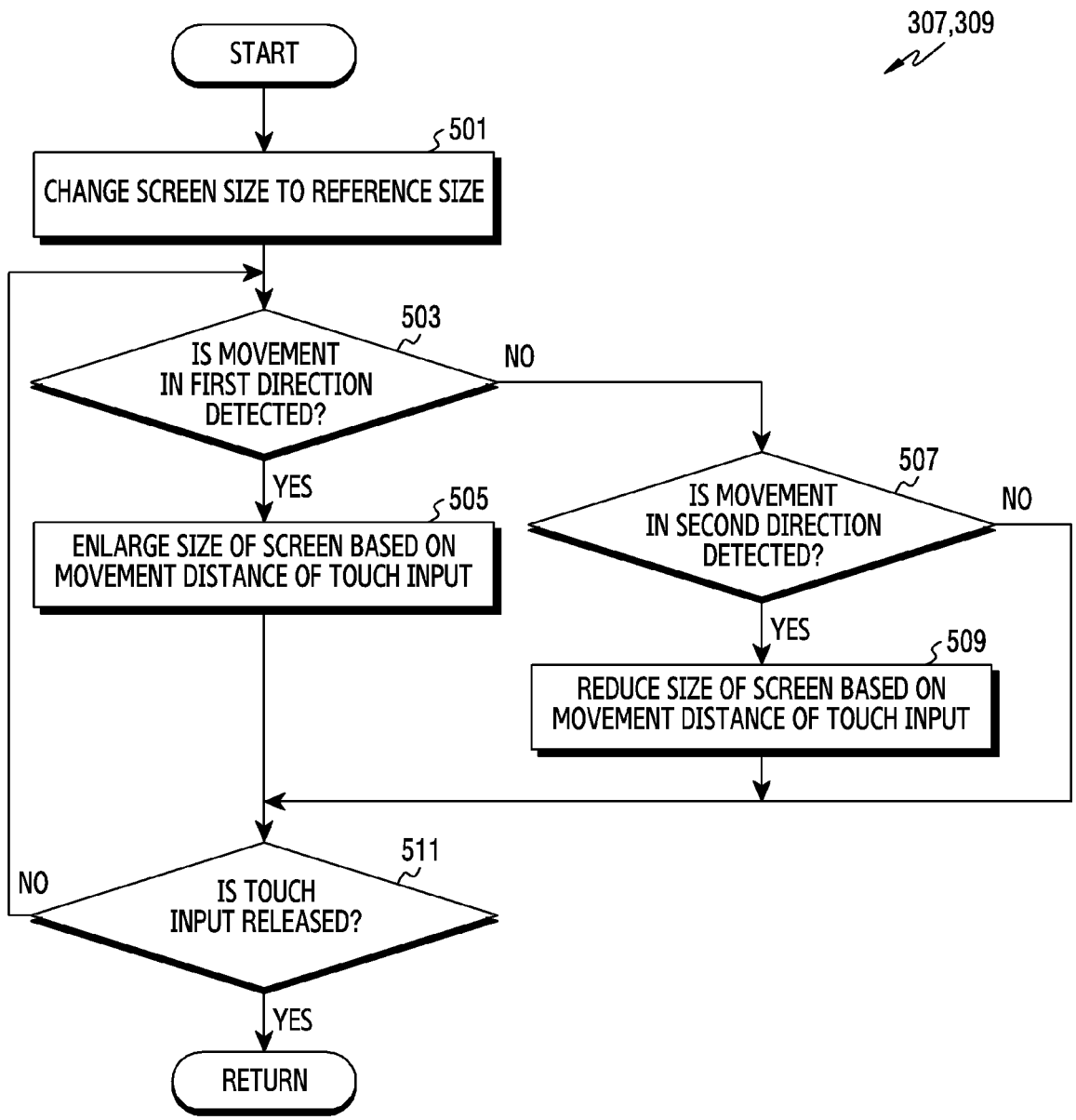
FIG. 5 is a flowchart for changing a screen size to a reference size when converting into a screen adjustment mode in an electronic device according to various embodiments of the disclosure.

FIG. 5 is a flowchart for changing a screen size to a reference size when converting into a screen adjustment mode in an electronic device according to various embodiments of the disclosure. Hereinafter, the operation for adjusting the screen size in operations 307 to 309 of FIG. 3 will be described. In the following description, the electronic device may include the electronic device 101 of FIG. 1 or at least part (for example, the processor 120) of the electronic device 101.

Referring to FIG. 5, when the operation mode of the electronic device is converted into the screen adjustment mode (for example, operation 305 of FIG. 3), the electronic device may change the screen size to a reference size in operation 501. For example, when the movement range of the touch input 610 detected in the reference region 604 goes beyond the reference range 602 as shown in FIG. 6A, the processor 120 may activate the screen adjustment mode of the electronic device 101. When the screen adjustment mode is activated, the processor 120 may control the display 160 to reduce the screen size of the display 160 to a reference size 620 or 650 as shown in FIG. 6B or 6D. For example, when the screen size of the display 160 is reduced to the reference size 620, the display 160 may display at least one of state information and a control menu of the electronic device on the other region on which the service screen is not displayed. The state information of the electronic device may include activation information 630 of the screen adjustment mode. The control menu may include a setting menu 632 and the screen size fixing menu 634. For example, the reference size may be pre-defined as a fixed size or may be set based on user's history of adjusting the screen size.

In operation 503, the electronic device may determine whether the touch input going beyond the reference range moves in a first direction. For example, the processor 120 may determine a movement direction of the touch input by comparing a plurality of continuous touch points obtained through the touch sensor (touch panel). For example, the first direction may include the opposite direction to the movement direction of the touch input for activating the screen adjustment mode.

When the touch input moves in the first direction, the electronic device may enlarge the size of the screen based on a movement distance of the touch input in operation 505. For example, when the touch input moves in the first direction (622→624) in the activation state of the screen adjustment mode as shown in FIG. 6B, the processor 120 may enlarge the size of the screen to correspond to a movement distance of the touch input as shown in FIG. 6C (640).

When the touch input going beyond the reference range does not move in the first direction, the electronic device may determine whether the touch input moves in a second direction in operation 507. For example, the processor 120 may detect an angle change between a plurality of touch points continuously detected. When the angle change between the touch point falls within a first angle range, the processor 120 may determine that the movement direction of the touch input is the first direction. When the angle change between the touch points falls within a second angle range, the processor 120 may determine that the movement direction of the touch input is the second direction. For example, the second direction may include the same direction as the movement direction of the touch input for activating the screen adjustment mode.

When the touch input moves in the second direction, the electronic device may reduce the size of the screen based on a movement distance of the touch input. For example, when the touch input moves in the first direction (652→654) in the activation state of the screen adjustment mode as shown in FIG. 6D, the processor 120 may reduce the size of the screen to correspond to a movement distance of the touch input as shown in FIG. 6E (660).

When the size of the screen is adjusted (enlarged or reduced) based on the movement of the touch input, or when the movement of the touch input is not detected, the electronic device may determine whether the touch input is released in operation 511.

When the touch input is maintained, the electronic device may determine whether a movement direction of the touch input is the first direction again in operation 503.

Figure 7:
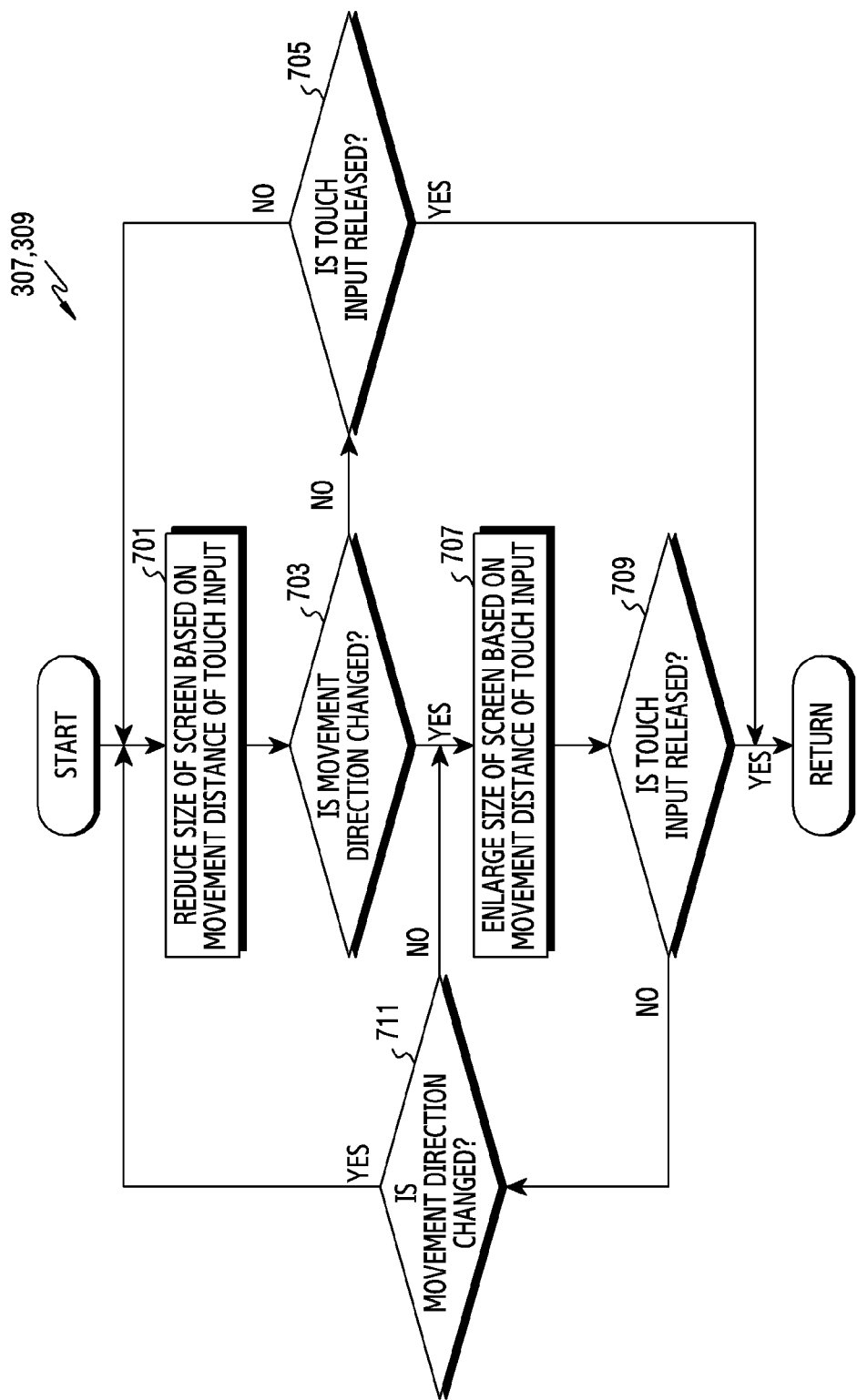
FIG. 7 is a flowchart for adjusting a screen size based on a movement direction of a touch input in an electronic device according to various embodiments of the disclosure.
Figure 8A:
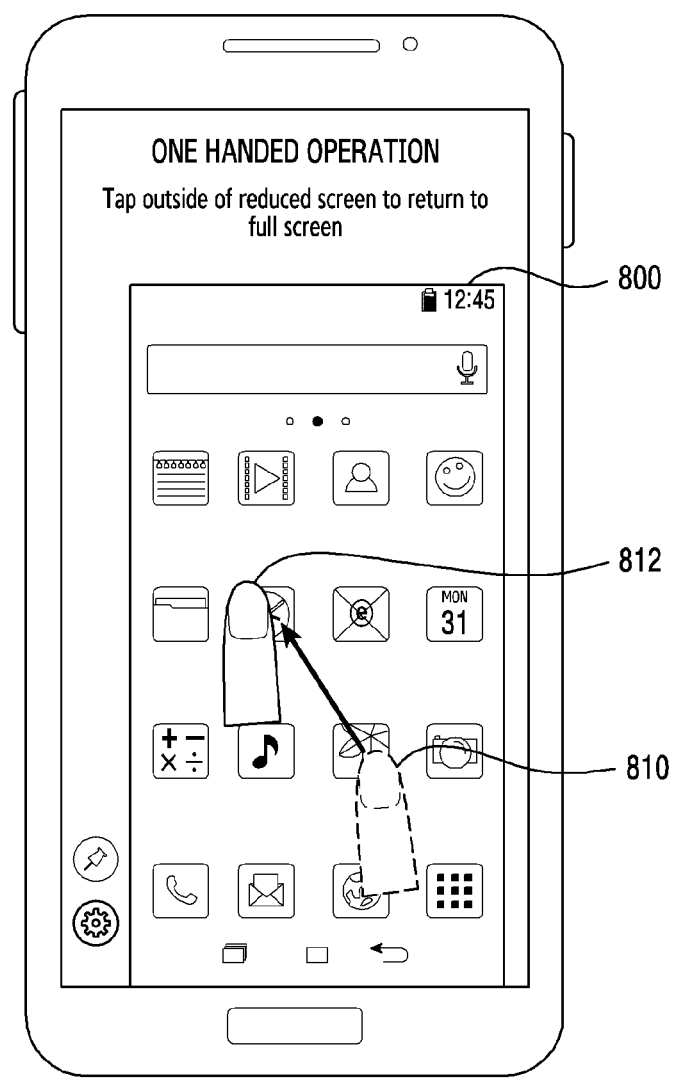
FIGS. 8A to 8C are views illustrating screen configurations for adjusting a screen size based on a movement direction of a touch input in an electronic device according to various embodiments of the disclosure.
Figure 8B:
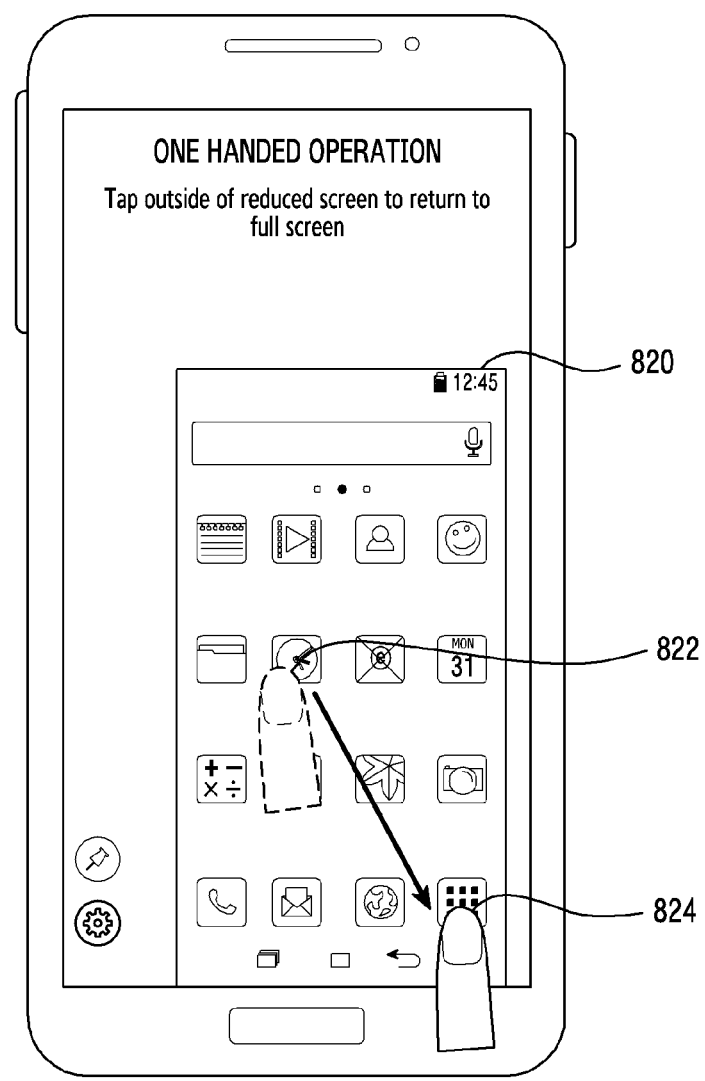
Figure 8C:
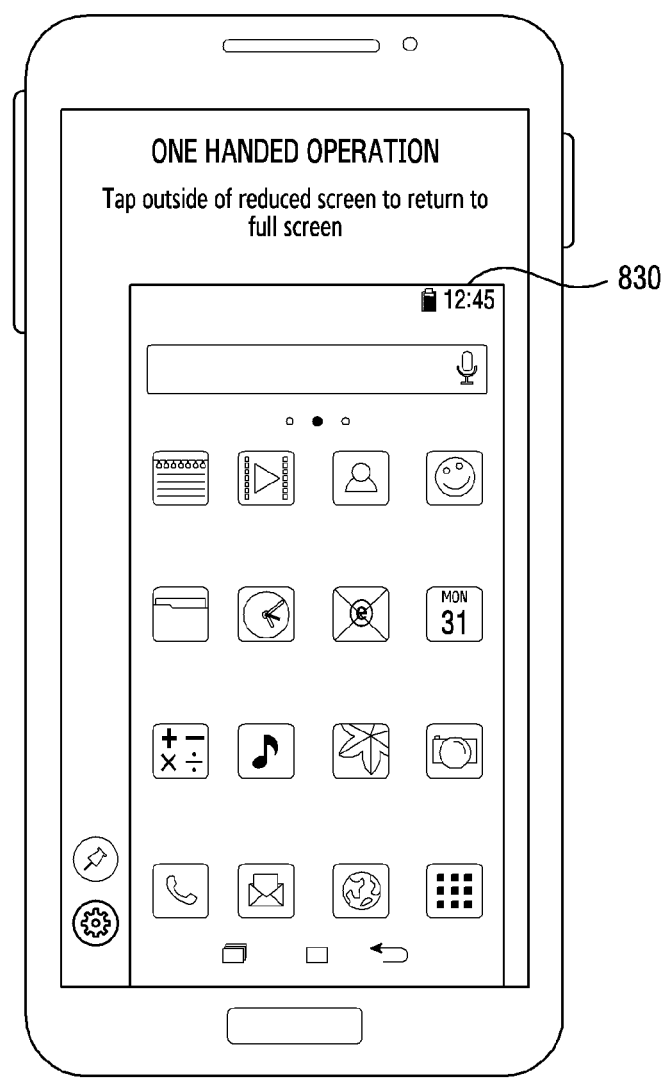

FIG. 7 illustrates a flowchart for adjusting a screen size based on a movement direction of a touch input in an electronic device according to various embodiments of the disclosure. FIGS. 8A to 8C illustrate screen configurations for adjusting a screen size based on a movement direction of a touch input in an electronic device according to various embodiments of the disclosure. Hereinafter, the operation for adjusting the screen size in operation 307 to 309 of FIG. 3 will be described. In the following description, the electronic device may include the electronic device 101 of FIG. 1 or at least part (for example, the processor 120) of the electronic device 101.

Referring to FIG. 7, when the operation mode of the electronic device is converted into the screen adjustment mode (for example, operation 305 of FIG. 3), the electronic device may reduce the size of the screen based on a movement distance of the touch input in operation 701. For example, the processor 120 may activate the screen adjustment mode of the electronic device 101 at the time that the movement range of the touch input 610 detected in the reference region 604 goes beyond the reference range 602 as shown in FIG. 6A. Accordingly, the processor 120 may control the display 160 to reduce the size (screen size) of the display region on which the service screen is displayed in the display 160, based on a movement distance of the touch input, as shown in FIG. 8A. In this case, the processor 120 may control the display 160 to reduce the size of the screen in the opposite direction to the movement direction of the touch input. Specifically, when the movement 612 of the touch input 610 from the right lower corner region (reference region 604) to the left is detected as shown in FIG. 6A, the processor 120 may control the display 160 to reduce the screen size in a direction from the left to the right corner as shown in FIG. 8A. For example, the movement distance of the touch input may include a movement distance of the touch input from the time that the screen adjustment mode is activated.

In operation 703, the electronic device may determine whether the movement direction of the touch input is changed. For example, when an angle change between a plurality of touch inputs continuously detected falls within a second range as shown in FIG. 8A, the processor 120 may control the display 160 to reduce the size of the screen based on a movement distance (810→812) of the touch input as shown in FIG. 8B. The processor 120 may determine whether the angle change between the touch points is changed to a first range by a movement of the touch input.

When the movement direction of the touch input is not changed, the electronic device may determine whether the touch input is released in operation 705.

When the touch input is not released, the electronic device may reduce the size of the screen to correspond to a movement distance of the touch input in operation 701. For example, when the movement of the touch input is not detected, the processor 120 may control the display 160 to maintain the size of the screen currently set.

When the movement direction of the touch input is changed, the electronic device may enlarge the size of the screen to correspond to a movement distance of the touch input. For example, when the movement direction of the touch input is changed to the first direction as shown in FIG. 8B, the processor 120 may control the display 160 to enlarge the size (screen size) for displaying the service screen based on a movement distance (822→824) of the touch input as shown in FIG. 8C. Specifically, when the movement 824 of the touch input 822 from the left of the display 160 to the right is detected as shown in FIG. 8B, the processor 120 may control the display 160 to enlarge the screen size from the right corner to the left as shown in FIG. 8C. For example, the movement distance of the touch input may include a movement distance of the touch input from the time that the movement direction of the touch input is changed.

In operation 709, the electronic device may determine whether the touch input for enlarging the screen size is released.

When the touch input is maintained, the electronic device may determine whether the movement direction of the touch input is changed in operation 711.

When the movement direction of the touch input is not changed, the electronic device may enlarge the size of the screen to correspond to a movement distance of the touch input in operation 707. For example, when the movement of the touch input is not detected, the processor 120 may control the display 160 to maintain the size of the screen currently set.

When the movement direction of the touch input is changed, the electronic device may reduce the size of the screen to correspond to a movement distance of the touch input in operation 701.

Figure 9:
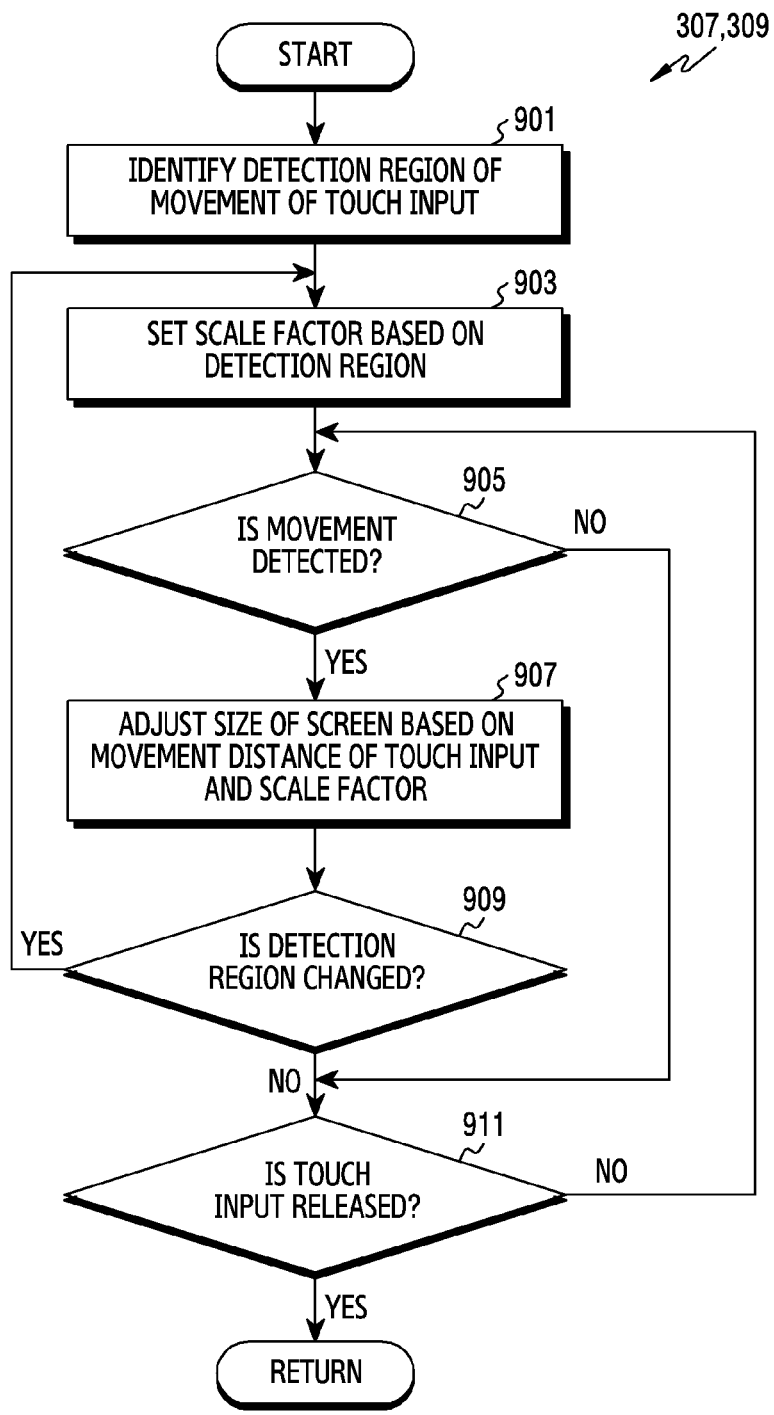
FIG. 9 is a flowchart for adjusting a screen size based on a movement region of a touch input in an electronic device according to various embodiments of the disclosure.

FIG. 9 illustrates a flowchart for adjusting a screen size based on a movement region of a touch input in an electronic device according to various embodiments of the disclosure. FIGS. 10A to 10D illustrate screen configurations for adjusting a screen size based on a movement region of a touch input in an electronic device according to various embodiments of the disclosure. Hereinafter, the operation for adjusting the screen size in operations 307 to 309 of FIG. 3 will be described. In the following description, the electronic device may include the electronic device 101 of FIG. 1 or at least part (for example, the processor 120) of the electronic device 101.

Figure 10A:
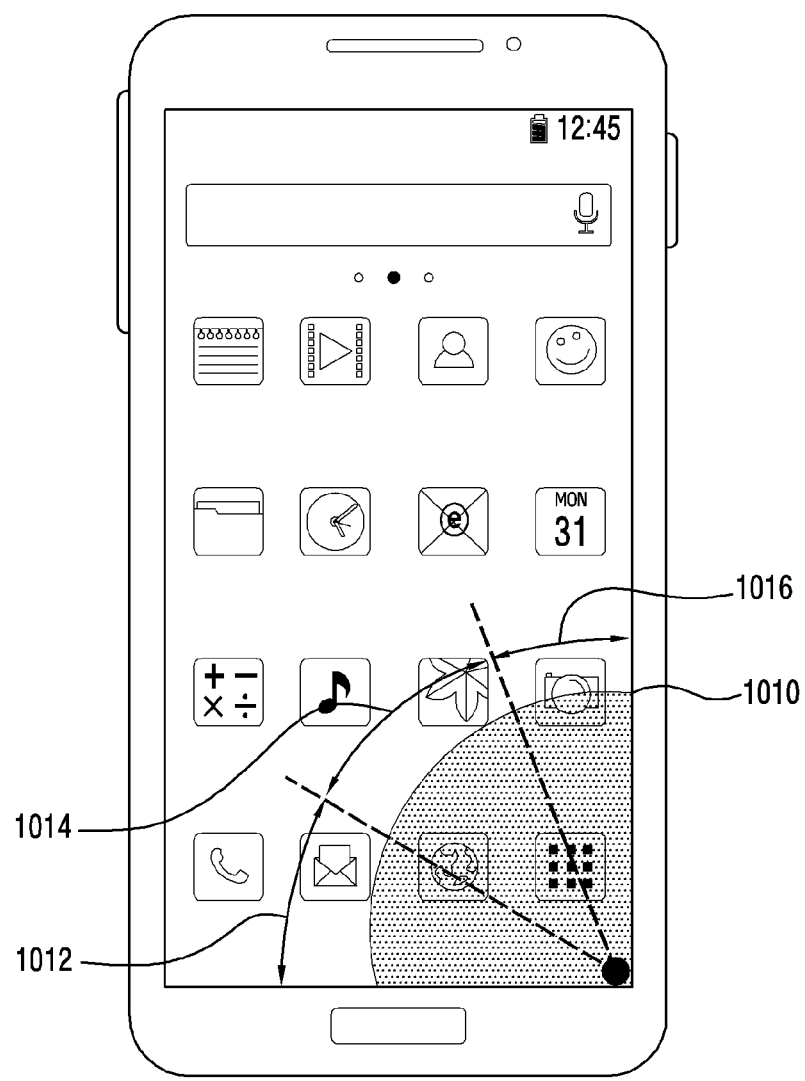
FIGS. 10A to 10D are views illustrating screen configurations for adjusting a screen size based on a movement region of a touch input in an electronic device according to various embodiments of the disclosure.

Referring to FIG. 9, when the operation mode of the electronic device is converted into the screen adjustment mode (for example, operation 305 of FIG. 3), the electronic device may identify a region where a movement of the touch input is detected (detection region) in operation 901. For example, the electronic device 101 may split the display 160 into three virtual detection regions 1012, 1014, 1016 with reference to a reference region (for example, the reference region 604 of FIG. 6A) as shown in FIG. 10A. The processor 120 may identify the region where the touch input is detected at the time that the screen adjustment mode of the electronic device 101 is activated.

Figure 10B:
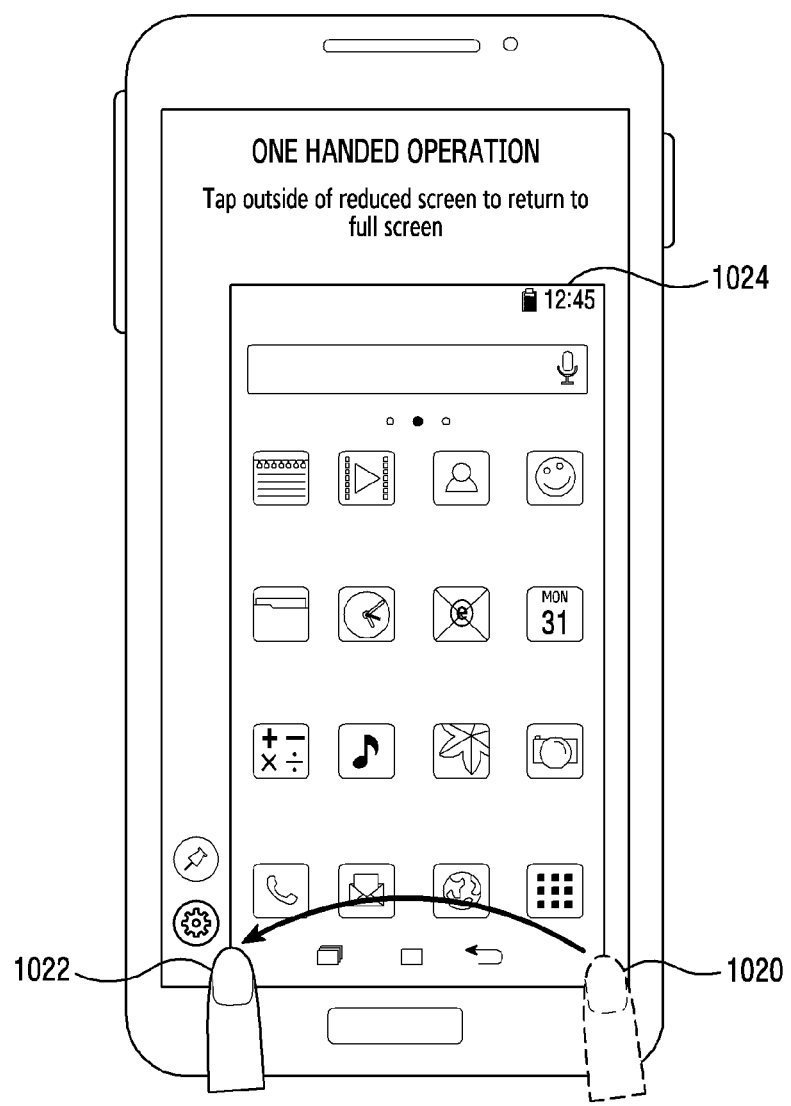
Figure 10C:
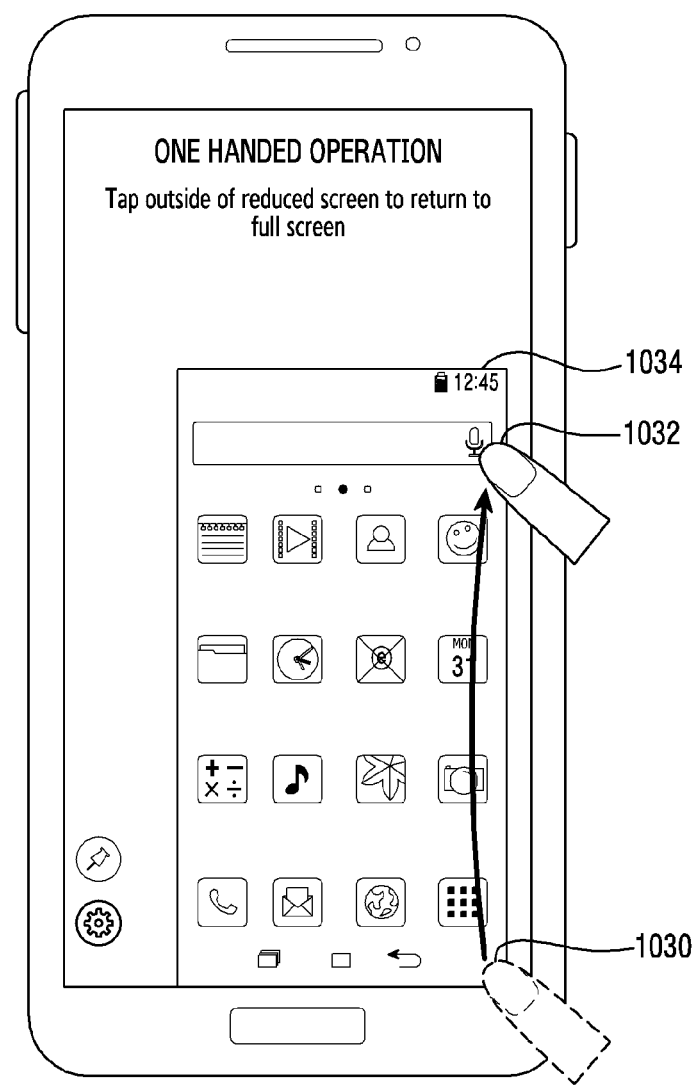
Figure 10D:
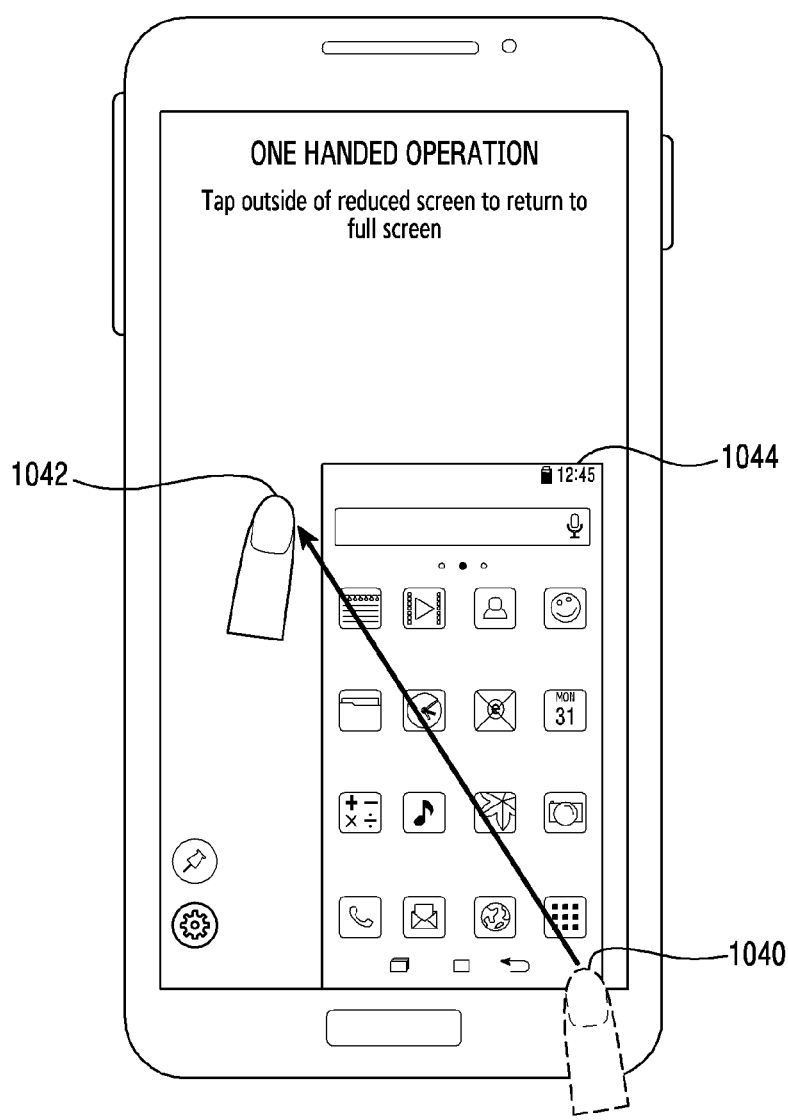

In operation 903, the electronic device may set a scale factor for adjusting the screen size based on the region where the touch input is detected. For example, when the touch input at the time that the screen adjustment mode of the electronic device 101 is activated is included in the first region 1012 as shown in FIG. 10B, the processor 120 may set a scale factor of a relatively lower ratio than those of the other regions 1014 and 1016 as the scale factor for adjusting the screen size. For example, the processor 120 may set a scale factor in which an adjustment ratio of the screen size to a movement distance of the touch input is set to 1. For example, when the touch input at the time that the screen adjustment mode of the electronic device 101 is activated is included in the third region 1016 as shown in FIG. 10C, the processor 120 may set a scale factor of a relatively higher ratio than that of the first region 1012 as the scale factor for adjusting the screen size. For example, when the touch input at the time that the screen adjustment mode of the electronic device 101 is activated is included in the second region 1014 as shown in FIG. 10D, the processor 120 may set a scale factor of a relatively higher ratio than those of the other regions 1012 and 1016 as the scale factor for adjusting the screen size. For example, the scale factor may include a ratio for adjusting the size of the screen in comparison to a movement distance of the touch input. Accordingly, as the scale factor increases, the processor 120 may adjust the size of the screen relatively rapidly, and, as the scale factor decreases, the processor 120 may adjust the size of the screen relatively precisely.

In operation 905, the electronic device may determine whether a movement of the touch input is detected. For example, the processor 120 may determine whether a change in touch coordinates is continuously detected through the touch sensor. When the change in the touch coordinates is continuously detected, the processor 120 may determine that the movement of the touch input is detected.

When the movement of the touch input is detected, the electronic device may enlarge the size of the screen based on a movement distance of the touch input and the scale factor in operation 907. For example, when a movement (1020→1022) of the touch input is detected in the detected first region 1012 as shown in FIG. 10B, the processor 120 may control the display 160 to adjust (for example, reduce) the size of the screen (1024) based on a movement distance of the touch input and a first scale factor of the first region 1012. For example, when a movement (1030→1032) of the touch input is detected in the detected third region 1016 as shown in FIG. 10C, the processor 120 may control the display 160 to adjust the size of the screen (1034) based on a movement distance of the touch input and a third scale factor of the third region 1016. In this case, the display 160 may adjust the size of the screen more rapidly than when the size of the screen is adjusted based on the first scale factor as shown in FIG. 10B. For example, when a movement (1040→1042) of the touch input is detected in the detected second region 1014 as shown in FIG. 10D, the processor 120 may control the display 160 to adjust the size of the screen (1044) based on a movement distance of the touch input and a second scale factor of the second region 1014. In this case, the display 160 may adjust the size of the screen more rapidly than when the size of the screen is adjusted based on the third scale factor as shown in FIG. 10C. That is, when the movement distances of the touch inputs are the same, the display 160 may adjust the size of the screen reduced based on the movement distance of the touch input in the second region 1014 to be smaller than the sizes of the screens reduced based on the movement distances of the touch inputs in the first region 1012 and the third region 1016.

In operation 909, the electronic device may determine whether the region where the touch input is detected (detection region) is changed according to the movement of the touch input.

When the region where the touch input is detected is changed, the electronic device may change the scale factor for adjusting the screen size to correspond to the region where the touch input is detected in operation 903. For example, when the movement of the touch input in the second region 1014 is detected as shown in FIG. 10D, the processor 120 may control the display 160 to adjust the size of the screen based on the second scale factor and the movement distance of the touch input. When the touch input is detected in the first region 1012 by the movement of the touch input, the processor 120 may change the scale factor for adjusting the screen size to the first scale factor.

When the movement of the touch input is not detected (operation 905) or the detection region of the touch input is not changed (operation 909), the electronic device may determine whether the touch input is released in operation 911.

When the touch input is maintained, the electronic device may determine whether a movement of the touch input is detected again in operation 905.

According to various embodiments of the disclosure, the electronic device may change a speed for adjusting the screen size to correspond to the region where the movement of the touch input is detected (detection region). For example, when the touch input at the time that the screen adjustment mode of the electronic device 101 is activated is included in the first region 1012 as shown in FIG. 10B, the processor 120 may set a relatively higher screen adjustment speed than those of the other regions 1014 and 1016. For example, when the touch input at the time that the screen adjustment mode of the electronic device 101 is activated is included in the third region 1015 as shown in FIG. 10C, the processor 120 may set a relatively lower screen adjustment speed than that of the first region 1012. For example, when the touch input at the time that the screen adjustment mode of the electronic device 101 is activated is included in the second region 1014 as shown in FIG. 10D, the processor 120 may set a relatively lower screen adjustment speed than those of the other regions 1012 and 1016.

Figure 11:
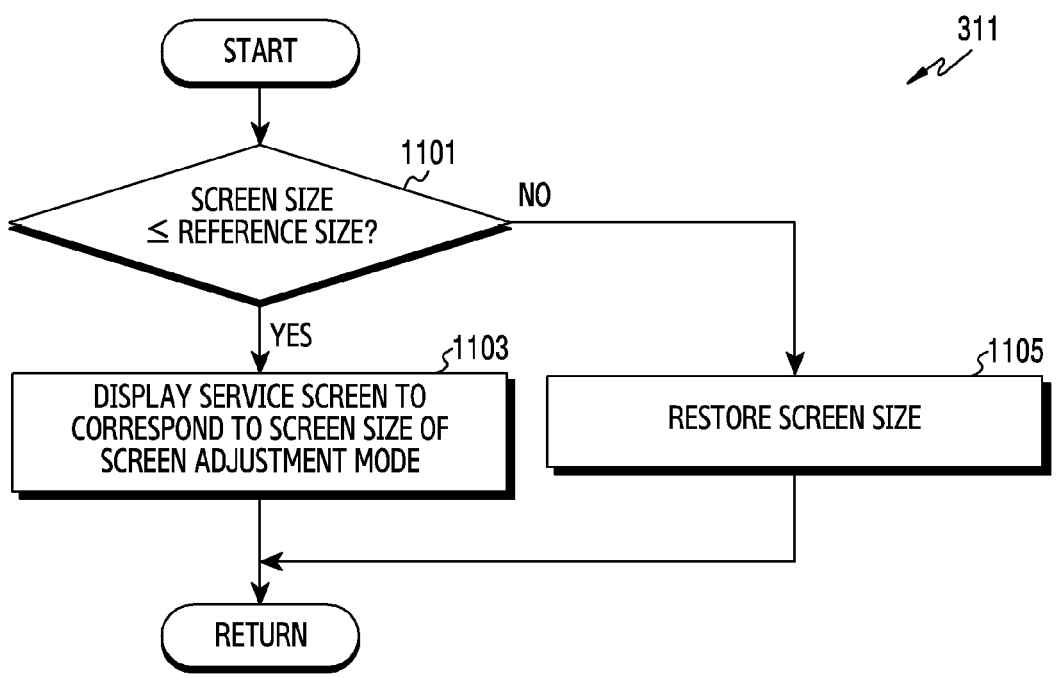
FIG. 11 is a flowchart for setting a screen size of a screen adjustment mode in an electronic device according to various embodiments of the disclosure.

FIG. 11 illustrates a flowchart for setting a screen size of a screen adjustment mode in an electronic device according to various embodiments of the disclosure. Hereinafter, the operation for setting the screen size of the screen adjustment mode in operation 311 of FIG. 3 will be described. In the following description, the electronic device may include the electronic device 101 of FIG. 1 or at least part (for example, the processor 120) of the electronic device 101.

Referring to FIG. 11, when the touch input is released (for example, operation 309 of FIG. 3), the electronic device may determine whether the screen size adjusted based on the movement distance of the touch input is smaller than a reference size by comparing in operation 1101. For example, the reference size may be pre-defined as a fixed size, or may be adaptively set based on user's history of adjusting the screen.

When the screen size adjusted based on the movement distance of the touch input is smaller than or equal to the reference size, the electronic device may display the service screen to correspond to the screen size adjusted based on the movement distance of the touch input in operation 1103. For example, when the screen size set at the time that the touch input is released is smaller than or equal to the reference size, the processor 120 may determine that the screen adjustment mode is maintained. Accordingly, the processor 120 may control the display 160 to maintain the display of the service screen which is displayed in the screen size set at the time that the touch input is released.

When the screen size adjusted based on the movement distance of the touch input exceeds the reference size, the electronic device 1105 may restore the screen size to the original size in operation 1105. For example, when the screen size set at the time that the touch input is released exceeds the reference size, the processor 120 may determine that it is not necessary to use the screen adjustment mode. Accordingly, the processor 120 may restore the screen size changed based on the movement distance of the touch input to the original size. For example, the original size may include a size of the full region of the display 160 on which the service screen is displayed.

According to an embodiment, when the screen size is reduced according to the screen adjustment mode, the electronic device may restore the screen size based on a touch input in the other region on which the service screen is not displayed. For example, when the screen size is reduced according to the screen adjustment mode, the processor 120 may control the display 160 to display guide information ("Tap outside of reduced screen to full screen") for restoring to the original size on the other region on which the service screen is not displayed. When a tap input on the other region is detected through the touch sensor, the processor 120 may inactivate the screen adjustment mode. That is, the processor 120 may control the display 160 to restore the screen size to the original size. Additionally or alternatively, when the screen size fixing menu 634 of FIG. 6B is activated, the processor 120 may continuously maintain the screen size according to the screen adjustment mode. For example, when the screen size fixing menu 634 is activated, the processor 120 may control to maintain the screen size even if a tap input on the other region is detected.

According to various embodiments of the disclosure, when the electronic device uses a screen size exceeding the reference size, the electronic device may determine that it is not necessary to use the screen adjustment mode. Accordingly, the electronic device may adjust the size of the screen from the time that a movement distance of the touch input from a touch point at which the movement of the touch input detected in the reference region goes beyond the reference range exceeds a predetermined distance.

Figure 12:
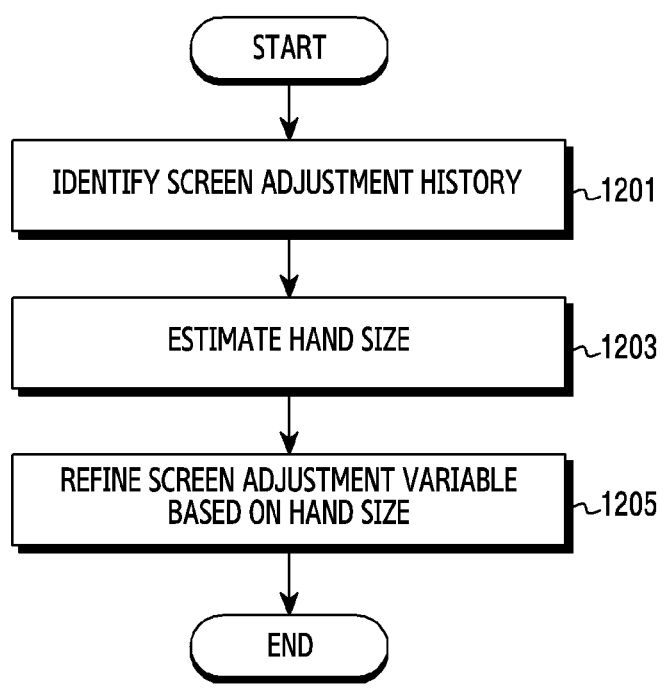
FIG. 12 is a flowchart for setting a screen adjustment variable in an electronic device according to various embodiments of the disclosure.

FIG. 12 illustrates a flowchart for setting a screen adjustment variable in an electronic device according to various embodiments of the disclosure. In the following description, the electronic device may include the electronic device 101 of FIG. 1 or at least part (for example, the processor 120) of the electronic device 101.

Referring to FIG. 12, in operation 1201, the electronic device may identify a screen adjustment history according to a movement of a touch input. For example, when a screen size of the screen adjustment mode is set based on the release of the touch input, the processor 120 may control the memory 130 to accumulate and store screen adjustment history information. Accordingly, when the number of times of accumulation of the screen adjustment history information exceeds a reference number of times, the processor 120 may extract the screen adjustment history information stored in the memory 130. For example, the screen adjustment history information may include at least one of a screen size of the screen adjustment mode, a movement distance of a touch input, and a region where a movement of the touch input is detected.

In operation 1203, the electronic device may estimate a hand size of the user gripping the electronic device based on the screen adjustment history. For example, the processor 120 may estimate the length of a finger (for example, thumb) used to select an object with the electronic device 101 being gripped, based on a movement distance of the touch input for adjusting the size of the screen.

In operation 1205, the electronic device may refine a variable for adjusting the size of the screen (screen adjustment variable) based on the hand size of the user. For example, the processor 120 may refine at least one of the size of the reference range and the scale factor to correspond to the size of the hand estimated in operation 1203. For example, the processor 120 may refine at least one of the size of the reference range and the scale factor to correspond to a ratio between a reference hand size corresponding to the screen adjustment variable and the hand size of the user.

Figure 13:
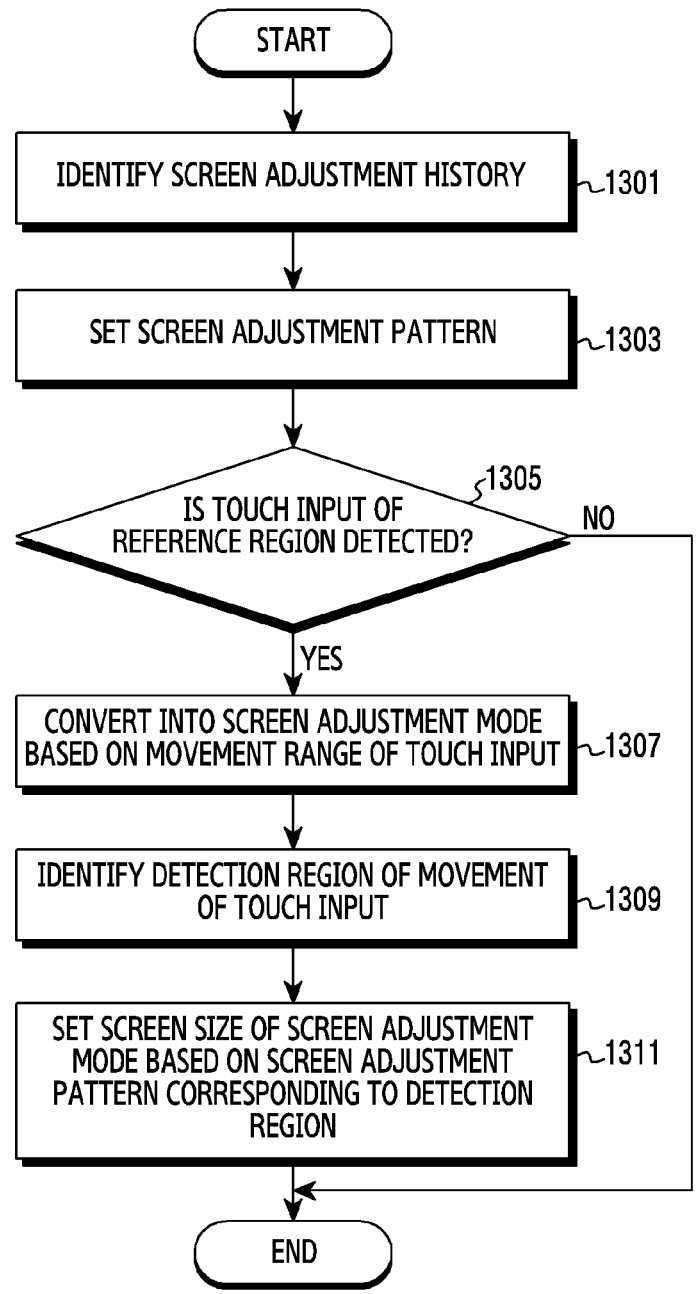
FIG. 13 is a flowchart for adjusting a screen size based on a screen adjustment history in an electronic device according to various embodiments of the disclosure.

FIG. 13 illustrates a flowchart for adjusting a screen size based on a screen adjustment history in an electronic device according to various embodiments of the disclosure. In the following description, the electronic device may include the electronic device 101 of FIG. 1 or at least part (for example, the processor 120) of the electronic device 101.

Referring to FIG. 13, in operation 1301, the electronic device may identify a screen adjustment history according to a movement of a touch input detected in a reference region. For example, when occurrence of a screen adjustment pattern setting event is detected, the processor 120 may detect screen adjustment history information stored in the memory 130. For example, the processor 120 may determine whether the screen adjustment pattern setting event occurs, based on any one of the number of times of accumulation of the screen adjustment history information stored in the memory 130, and a screen adjustment pattern setting period. For example, the screen adjustment history information may include at least one of a screen size of the screen adjustment mode, a movement distance of a touch input, and a region where a movement of the touch input is detected.

In operation 1303, the electronic device may detect a screen adjustment pattern based on the screen adjustment history. For example, the processor 120 may detect a screen size preferred by the user in each region 1012, 1014, or 1016, based on a screen size of the screen adjustment mode set in each region 1012, 1014, or 1016 which are split as shown in FIG. 10A.

In operation 1305, the electronic device may determine whether a touch input is detected in a reference region. For example, the processor 120 may determine whether a touch input on the reference region 604 set in a corner region of the display 160 as shown in FIG. 6A is detected by using the touch sensor.

In operation 1307, the electronic device may convert the operation mode of the electronic device into the screen adjustment mode, based on a movement range of the touch input detected in the reference region. For example, the processor 120 may determine whether the range of the movement 612 of the touch input 610 detected in the reference region 604 goes beyond the reference range as shown in FIG. 6A. When the range of the movement 612 of the touch input 610 goes beyond the reference range 602, the processor 120 may activate the screen adjustment mode of the electronic device 101.

In operation 1309, the electronic device may identify a region where the movement of the touch input is detected (detection region) at the time that the mode is converted into the screen adjustment mode. For example, the processor 120 may identify the region where the touch input is detected at the time that the movement range of the touch input goes beyond the reference range, from among virtual detection regions 1012, 1014, 1016 of the display 160 as shown in FIG. 10A.

In operation 1311, the electronic device may set a screen size of the screen adjustment mode based on a screen adjustment pattern corresponding to the region where the movement of the touch input is detected (detection region). For example, when the movement of the touch input is detected in the first detection region 1012 at the time that the mode is converted into the screen adjustment mode, the processor 120 may control the display 160 to adjust the screen size to correspond to the screen adjustment pattern of the first detection region 1012. When the movement of the touch input is detected in the third detection region 1016 at the time that the mode is converted into the screen adjustment mode, the processor 120 may control the display 160 to adjust the screen size to correspond to the screen adjustment pattern of the third detection region 1016. When the movement of the touch input is continuously detected, the processor 120 may control the display 160 to additionally adjust the size of the screen based on at least one of a movement distance of the touch input and the scale factor.

According to various embodiments of the disclosure, the electronic device may change the scale factor based on a movement direction of the touch input. For example, the electronic device 101 may adjust the screen size of the display 160 based on at least one of the movement distance of the touch input detected in the second region 1014, and the second scale factor as shown in FIG. 10D. When an upward (or downward) movement of the touch input is detected while the screen size is adjusted, the electronic device 101 may change the scale factor adjusting the screen size to a scale factor for precisely adjusting.

The term "module" used in the present document may include a unit consisting of hardware, software or firmware and, for example, may be used interchangeably with the terms "logic", "logic block", "component", "circuit" or the like. The "module" may be an integrally configured component or the minimum unit performing one or more functions or a part thereof. The "module" may be implemented mechanically or electronically and, for example, may include an application-specific integrated circuit (ASIC) chip, field-programmable gate arrays (FPGAs) or a programmable logic device, which has been known or will be developed in future, performing some operations.

At least a part of an apparatus (e.g., modules or functions thereof) or method (e.g., operations) according to various embodiments may, for example, be implemented by an instruction that is stored in a computer-readable storage media in the form of a program module. In case where the instruction is executed by a processor (e.g., the processor 120), the processor may perform a function corresponding to the instruction. The computer-readable recording media may include a hard disk, a floppy disk, a magnetic media (e.g., a magnetic tape), an optical recording media (e.g., a compact disc-read only memory (CD-ROM) or a DVD), a magneto-optical media (e.g., a floptical disk), an internal memory, etc. The instruction may include a code that is made by a compiler or a code that is executable by an interpreter. The module or program module according to various embodiments may include at least one or more of the aforementioned constituent elements, or omit some, or further include another constituent element.

Operations carried out by the module, the program module or the another constituent element according to various embodiments may be executed in a sequential, parallel, repeated or heuristic manner, or at least some operations may be executed in different order or be omitted, or another operation may be added.

The embodiments disclosed herein are proposed to help with description and comprehension of disclosed technical contents, and do not limit the scope of various embodiments of the present disclosure. Therefore, the scope of the various embodiments of the present disclosure should be construed as including all modifications or various other embodiments based on the spirit and scope of the various embodiments of the present disclosure.

What is claimed is:

1. An electronic device comprising:
a touch screen; and
a processor,
wherein the processor configured to:
detect a touch input from a reference region which is set in at least a partial region of the touch screen;
when a movement of the touch input is detected, activate a screen adjustment mode based on a movement range of the touch input;
when the touch input is maintained, adjust a screen size of the touch screen based on a movement distance of the touch input; and
when the touch input is released, set a screen size at a time that the touch input is released as a screen size of the screen adjustment mode wherein the processor is configured to determine whether the touch input is detected through the reference region set in at least part of a corner region of the touch screen.

2. The electronic device of claim 1, wherein the processor is configured to:
when the movement of the touch input is detected, determine whether the movement range of the touch input goes beyond a reference range; and
when the movement range of the touch input goes beyond the reference range, convert an operation mode of the electronic device into the screen adjustment mode.

3. The electronic device of claim 1, wherein the processor controls to:
when the screen adjustment mode is activated, reduce the screen size of the touch screen to a reference size; and
when the touch input is maintained, adjust the screen size of the touch screen based on a movement distance of the touch input.

4. The electronic device of claim 1, wherein, when the touch input is maintained, the processor controls to reduce the size of the screen in the opposite direction to a movement direction of the touch input.

5. The electronic device of claim 1, wherein, when the touch input is maintained in an activation state of the screen adjustment mode, the processor is configured to enlarge or reduce the screen size of the touch screen, based on a movement direction of the touch input and a movement distance of the touch input.

6. The electronic device of claim 1, wherein, when the touch input is maintained in an activation state of the screen adjustment mode, the processor is configured to adjust the screen size of the touch screen based on a movement direction of the touch input, a movement distance of the touch input, and a scale factor, and
wherein the scale factor is set to correspond to a region where the movement of the touch input is detected from among a plurality of regions included in a display region of the touch screen which are split with reference to the reference region.

7. The electronic device of claim 1, wherein, when the touch input is released, the processor is configured to:
when the touch input is released, compare a screen size at the time that the touch input is released and a reference screen size; and
when the screen size is smaller than the reference screen size, set the screen size as the screen size of the screen adjustment mode.

8. The electronic device of claim 1, wherein the processor is configured to:
when the screen size of the screen adjustment mode is set, store setting information of the screen size in a memory of the electronic device; and
refine a variable for adjusting the screen size based on the setting information of the screen size stored in the memory,
wherein the variable comprises at least one of a reference range and a scale factor.

9. The electronic device of claim 1, wherein the processor is configured to set a size of a home screen based on the screen size of the screen adjustment mode after setting the screen size at the time that the touch input is released as the screen size of the screen adjustment mode.

10. An operation method of an electronic device, the method comprising:
detecting a touch input from a reference region which is set in at least a partial region of a touch screen of the electronic device;
when a movement of the touch input is detected, activating a screen adjustment mode based on a movement range of the touch input;
when the touch input is maintained, adjusting a screen size of the touch screen based on a movement distance of the touch input; and
when the touch input is released, setting a screen size at a time that the touch input is released as a screen size of the screen adjustment mode,
wherein detecting the touch input comprises detecting the touch input through the reference region set in at least part of a corner region of the touch screen.

11. The method of claim 10, further comprising:
when the screen size of the screen adjustment mode is set, determining whether a touch input of a screen displayed on the touch screen in the screen size of the screen adjustment mode is detected; and
when the touch input is detected, performing a function corresponding to the touch input.

12. The method of claim 10, wherein adjusting the screen size comprises, when the touch input is maintained in an activation state of the screen adjustment mode, adjusting the screen size of the touch screen based on a movement direction of the touch input, a movement distance of the touch input, and a scale factor, and
wherein the scale factor is set to correspond to a region where the movement of the touch input is detected from among a plurality of regions included in a display region of the touch screen which are split with reference to the reference region.

13. The method of claim 10, wherein setting the screen size comprises: when the touch input is released, comparing a screen size at the time that the touch input
is released and a reference screen size; and
when the screen size is smaller than the reference screen size, setting the screen size as the screen size of the screen adjustment mode.

14. The method of claim 13, further comprising, when the screen size is larger than the reference screen size, restoring the screen size of the touch screen to an original size.

15. The method of claim 10, wherein activating the screen adjustment mode comprises:
when the movement of the touch input is detected, determining whether the movement range of the touch input goes beyond a reference range; and
when the movement range of the touch input goes beyond the reference range, converting an operation mode of the electronic device into the screen adjustment mode.

16. The method of claim 10, wherein adjusting the screen size comprises:
when the screen adjustment mode is activated, reducing the screen size of the touch screen to a reference size; and
when the touch input is maintained, adjusting the screen size of the touch screen based on a movement distance of the touch input.

17. The method of claim 16, further comprising:
when the screen size of the screen adjustment mode is set, storing setting information of the screen size in a memory of the electronic device; and
refining a variable for adjusting the screen size based on the setting information of the screen size stored in the memory,
wherein the variable comprises at least one of a reference range and a scale factor.

18. The method of claim 10, wherein adjusting the screen size comprises, when the touch input is maintained in an activation state of the screen adjustment mode, enlarging or reducing the screen size of the touch screen, based on a movement direction of the touch input and a movement distance of the touch input.

* * * * *